United States Patent
Arakane

(10) Patent No.: US 10,967,632 B2
(45) Date of Patent: Apr. 6, 2021

(54) IMAGE RECORDING APPARATUS

(71) Applicant: Brother Kogyo Kabushiki Kaisha, Nagoya (JP)

(72) Inventor: Satoru Arakane, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 16/519,719

(22) Filed: Jul. 23, 2019

(65) Prior Publication Data

US 2020/0031118 A1 Jan. 30, 2020

(30) Foreign Application Priority Data

Jul. 26, 2018 (JP) ................................. 2018-140304

(51) Int. Cl.
*B41J 2/045* (2006.01)
*B41J 25/00* (2006.01)

(52) U.S. Cl.
CPC ....... *B41J 2/04536* (2013.01); *B41J 2/04586* (2013.01); *B41J 25/001* (2013.01)

(58) Field of Classification Search
CPC .. B41J 2/04536; B41J 2/04586; B41J 2/2132; B41J 25/001
See application file for complete search history.

(56) References Cited

U.S. PATENT DOCUMENTS

| | | | |
|---|---|---|---|
| 7,219,972 B2 | 5/2007 | Kanematsu et al. | |
| 9,039,120 B2 | 5/2015 | Nishioka | |
| 10,226,953 B2 | 3/2019 | Matsumura | |
| 2002/0118236 A1* | 8/2002 | Uetsuki | B41J 2/17566 347/7 |
| 2005/0195230 A1 | 9/2005 | Kanematsu et al. | |
| 2014/0218427 A1 | 8/2014 | Nishioka | |
| 2015/0054877 A1* | 2/2015 | Wada | B41J 2/2135 347/16 |
| 2016/0243858 A1* | 8/2016 | Ogimura | B41J 11/42 |
| 2017/0001458 A1 | 1/2017 | Matsumura | |
| 2017/0197427 A1* | 7/2017 | Yamada | B41J 2/14024 |

(Continued)

FOREIGN PATENT DOCUMENTS

| | | |
|---|---|---|
| JP | 2005-246641 A | 9/2005 |
| JP | 2008-143093 A | 6/2008 |

(Continued)

*Primary Examiner* — Jason S Uhlenhake
(74) *Attorney, Agent, or Firm* — Banner & Witcoff, Ltd.

(57) ABSTRACT

There is provided a liquid discharge apparatus including a conveyer, a carriage, a head and a controller. In a case of recording an image on a recording medium, the controller executes: obtaining information regarding a supply state of liquid from a liquid tank to the head in a case of executing each of recording passes; determining a moving velocity of the carriage with respect to each of the recording passes, based on the obtained information regarding the supply state; and adjusting a conveyance amount, by which the recording medium is conveyed in each of conveying operations, depending on moving velocities of the carriage determined with respect to two continuous recording passes, respectively, included in the recording passes, so as to adjust length in the conveyance direction of an overlap area in which recording areas by the two continuous recording passes overlap with each other.

12 Claims, 11 Drawing Sheets

(56) References Cited

U.S. PATENT DOCUMENTS

| | | | |
|---|---|---|---|
| 2017/0217233 | A1 | 8/2017 | Matsumura |
| 2017/0232746 | A1 | 8/2017 | Nishida |
| 2019/0143722 | A1 | 5/2019 | Matsumura |

FOREIGN PATENT DOCUMENTS

| | | | |
|---|---|---|---|
| JP | 2014-151461 | A | 8/2014 |
| JP | 2015-217632 | A | 12/2015 |
| JP | 2017-013425 | A | 1/2017 |
| JP | 2017-144726 | A | 8/2017 |

\* cited by examiner

IN A CASE THAT CARRIAGE VELOCITY IS NORMAL VELOCITY

IN A CASE THAT CARRIAGE VELOCITY IS LOW VELOCITY

CARRIAGE VELOCITIES OF TWO CONTINUOUS RECORDING PASSES ARE BOTH NORMAL VELOCITY
(IN A CASE THAT LENGTH IN CONVEYANCE DIRECTION OF OVERLAP AREA IS SHORT)

CARRIAGE VELOCITIES OF TWO CONTINUOUS RECORDING PASSES ARE BOTH NORMAL VELOCITY
(IN A CASE THAT LENGTH IN CONVEYANCE DIRECTION OF OVERLAP AREA IS APPROPRIATELY ADJUSTED)

MASK DATA IN A CASE THAT CONVEYANCE LENGTH OF OVERLAP AREA IS LENGTH E1

MASK DATA IN A CASE THAT CONVEYANCE LENGTH OF OVERLAP AREA IS LENGTH E3

MASK DATA IN A CASE THAT CONVEYANCE LENGTH OF OVERLAP AREA IS LENGTH E2

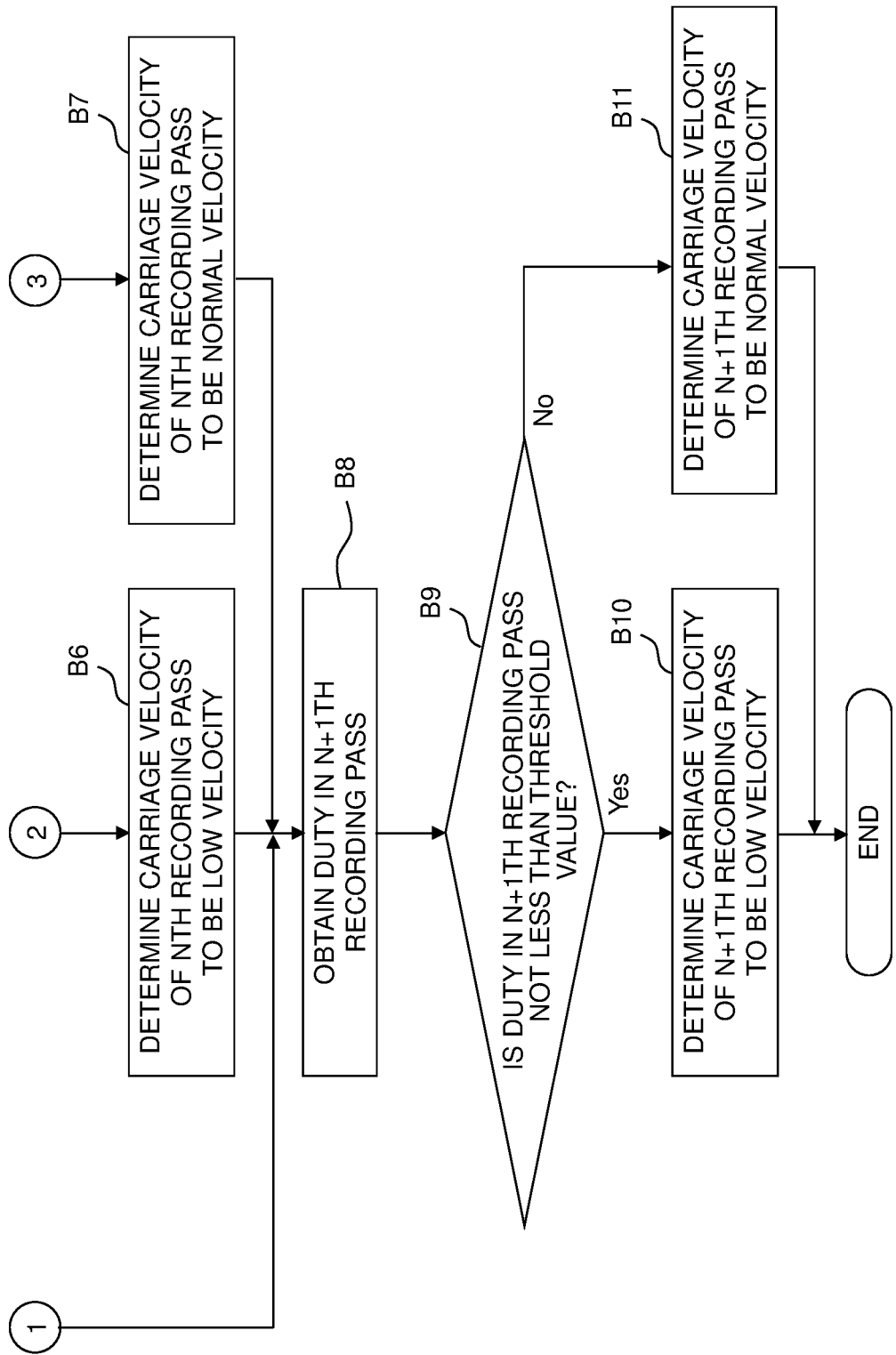

IMAGE RECORDING APPARATUS

CROSS REFERENCE TO RELATED APPLICATION

The present application claims priority from Japanese Patent Application No. 2018-140304, filed on Jul. 26, 2018, the disclosure of which is incorporated herein by reference in its entirety.

BACKGROUND

Field of the Invention

The present invention relates to an image recording apparatus.

Description of the Related Art

As an example of an image recording apparatus, there is a publicly known ink-jet recording apparatus which records an image on one piece of a recording medium by repeatedly performing a recording scanning (recording pass) of discharging an ink from a recording head while moving a carriage having the recording head mounted thereon in a main scanning direction to thereby record the image on the recording medium, and a conveying operation of conveying the recording medium in a conveyance direction orthogonal to the main scanning direction. In this ink-jet recording apparatus, the ink is suppled from an ink tank to the recording head via an ink path or ink route.

In the above-described ink-jet recording apparatus, there occurs any short supply (undersupply) of the ink to the recording head in some cases, due to a state of supply (supply state) of the ink from the ink tank to the recording head. For example, in a case that a discharge amount of the ink discharged from the recording head per unit time is great, the ink short supply to the recording head occurs. In a case that such a short supply of the ink to the recording head as described above occurs, there is such a fear that any unsatisfactory (failed) discharge of the ink might occur in the recording head.

In view of this situation, in a case that the above-described ink-jet recording apparatus records an image on one piece of the recording medium by performing a plurality of recording scannings, the above-described ink-jet recording apparatus obtains ink amount information regarding an amount of the ink which is to be used to perform each of the plurality of recording scannings, before starting each of the plurality of recording scannings. Further, regarding a certain recording scanning, among the plurality of recording scannings, regarding which an ink amount indicated by the ink amount information is greater than a predetermined threshold value, a moving velocity of the carriage is made to be slower than that in another recording scanning, among the plurality of recording scannings, regarding which an ink amount indicated by the ink amount information is smaller than the predetermined threshold value. By doing so, since the ink discharge amount of the ink to be discharged from the recording head per unit time is made to be small, it is possible to reduce the possibility of occurrence of the short supply of the ink to the recording head.

As described above, in the publicly known ink-jet recording apparatus, the plurality of recording scannings to be performed to record an image on one piece of the recording medium consequently include recording scannings which are mutually different in the moving velocity of the carriage.

SUMMARY

Here, the disclosing person of the present disclosure found out that as the moving velocity in the main scanning direction of the recording head in the case of performing the recording scanning is greater, a landing area (recording area) of the ink on the recording medium spreads to a greater extent in the conveyance direction due to various factors. Further, the disclosing person found out that as the extent to which the landing area of the ink spreads in the conveyance direction is greater, a landing amount of the ink becomes smaller at both end parts or portions in the conveyance direction of the landing area, as compared with a landing amount of the ink in a central part or portion in the conveyance direction of the landing area.

Thus, in a case that the plurality of recording scannings include recording scannings which are mutually different in the moving velocity of the carriage, as in the above-described ink-jet recording apparatus, there is such a fear that any streak-like unevenness in density occurs along the main scanning direction due to any difference in the landing positions of the ink in the conveyance direction between the recording scannings.

An object of the present disclosure is to provide an image recording apparatus capable of suppressing any degradation in the quality of an image recorded on a recording medium.

According to an aspect of the present disclosure, there is provided an image recording apparatus including: a conveyer configured to convey a recording medium in a conveyance direction; a carriage configured to reciprocate in a scanning direction crossing the conveyance direction; a head mounted on the carriage and configured to discharge the liquid supplied thereto from a liquid tank via a supply path, the head including a plurality of nozzles aligned in the conveyance direction; and a controller. The controller is configured to control the conveyer, the carriage and the head to execute: recording the image on one piece of the recording medium by alternately executing a plurality of recording passes each causing the liquid to be discharged from the plurality of nozzles while moving the carriage and a plurality of conveying operations each causing the conveyer to convey the recording medium. In a case that recording the image on one piece of the recording medium is executed, the controller is configured to execute: in each of the plurality of conveying operations, causing the conveyer, to convey the recording medium in the conveyance direction such that recording areas, on the recording medium, on which the image is recorded by two continuous recording passes of the plurality of recording passes, are partially overlapped with each other in the conveyance direction, obtaining, with respect to each of the plurality of recording passes, information regarding a supply state of the liquid from the liquid tank to the head in a case of executing each of the plurality of recording passes, determining a moving velocity of the carriage with respect to each of the plurality of recording passes, based on the information regarding the supply state, and adjusting a conveyance amount, by which the recording medium is conveyed in each of the plurality of conveying operations, depending on moving velocities of the carriage determined with respect to the two continuous recording passes, respectively, to adjust length in the conveyance direction of an overlap area in which the recording areas by the two continuous recording passes overlap with each other in the conveyance direction.

In the above-described case, since the recording areas of the two continuous recording passes are overlapped with each other, respectively at the end parts in the conveyance direction thereof in each of which the landing amount of the liquid is small, it is possible to reduce a part on the recording medium in which the landing amount of the liquid is small. Further, the spread in the conveyance direction of the recording area in the recording pass is changed depending on the moving velocity of the carriage; in the present disclosure, however, the length in the conveyance direction of the overlap area in which the recording areas of the two continuous recording passes, respectively, overlap with each other is adjusted depending on the moving velocities of the carriage determined with respect to the two continuous recording passes, respectively. By doing so, it is possible to overlap only parts, of the respective recording areas in the respective recording passes, in which the landing amounts of the liquid are small, respectively, with each other. As a result, it is possible to suppress any occurrence of the streak-like unevenness in density along the scanning direction, and thus to suppress any degradation in the quality of the image recorded on the recording medium.

BRIEF DESCRIPTION OF THE DRAWINGS

FIGS. 3A, 3B and 3C are each a view depicting an area in which an image is recorded by two continuous recording passes, wherein FIG. 3A depicts a case wherein the velocities of the carriage (carriage velocities) in the two continuous recording passes are both a normal velocity, FIG. 3B depicts a case wherein the carriage velocities in the two continuous recording passes are both a low velocity, and FIG. 3C depicts a case wherein any one of the carriage velocities in the two continuous recording passes is the normal velocity and the other of the carriage velocities in the two continuous recording passes is the low velocity.

FIGS. 6A and 6B are each a view explaining actual mask data and the corresponding relationship between the actual mask data and the reference mask data, wherein FIG. 6A depicts a case that the conveyance length of the overlap area is a length E1; FIG. 6B depicts a case that the conveyance length of the overlap area is a length E3.

FIGS. 8A and 8B depict a flow chart indicating the flow of a carriage velocity determining processing.

DESCRIPTION OF THE EMBODIMENTS

Figure 1:
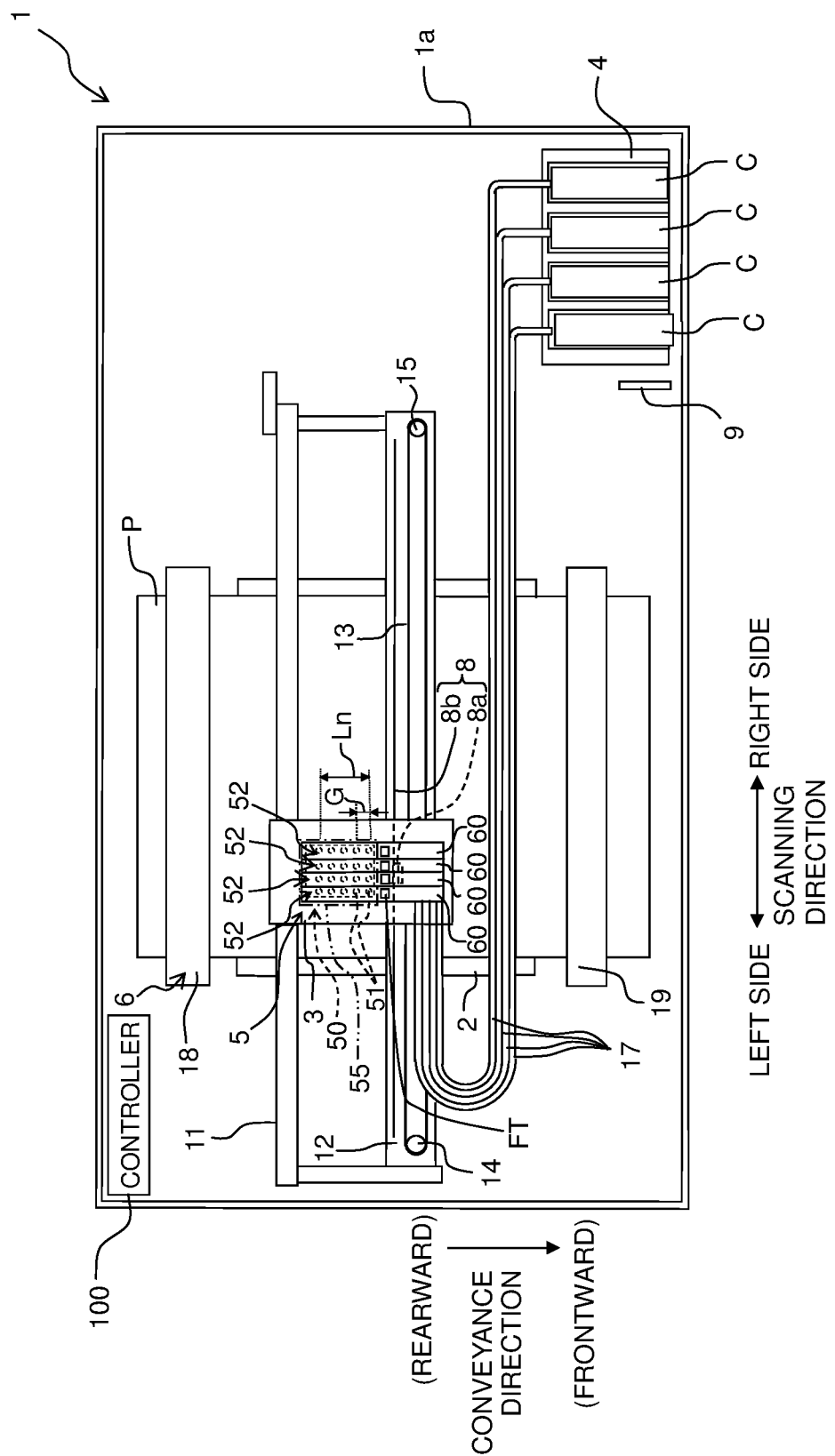
FIG. 1 is a schematic plan view of an ink-jet printer.

An explanation will be given about the schematic configuration of an ink-jet printer 1 (corresponding to an "image recording apparatus" of the present disclosure) according to an embodiment of the present disclosure. As depicted in FIG. 1, the ink-jet printer 1 has a casing 1a of which outer shape is a substantially rectangular parallelepiped as a whole. The casing 1a is provided with a platen 2, a carriage 3, a tank-installing part 4, a head unit 5, a conveying mechanism 6 (corresponding to a "conveyer" of the present disclosure), a linear encoder 8, a temperature measuring device 9 (corresponding to a "temperature sensor" of the present disclosure), a controller 100, etc. Note that in the following explanation, a front side of the sheet surface of FIG. 1 is defined as the "upper side" of the ink-jet printer 1, and a far side (back side) of the sheet surface of FIG. 1 is defined as the "lower side" of the ink-jet printer 1. Further, a front-rear direction and a left-right direction as depicted in FIG. 1 are defined as the "front-rear direction" and the "left-right direction", respectively, of printer 1.

A sheet P fed from a non-illustrated feeder is placed on the upper surface of the platen 2. Further, two guide rails 11, 12 extending in parallel with a scanning direction are arranged at a location above the platen 2. The carriage 3 is attached to the two guide rails 11, 12, and is movable in the scanning direction along the two guide rails 11, 12 in an area or region facing the sheet P on the platen 2. Furthermore, a driving belt 13 is attached to the carriage 3. The driving belt 13 is an endless belt wound around two pulleys 14, 15. A pulley 14 as one of the two pulleys 14, 15 is coupled to a carriage motor 16 (see FIG. 2). The pulley 14 is rotary-driven by the carriage motor 16 to thereby cause the driving belt 13 to run, which in turn allows the carriage 3 to reciprocate (move in a reciprocating manner) in the scanning direction.

The tank installing part 4 is arranged on the front side relative to the carriage 3 in the inside of the casing 1a. Four ink cartridges C (corresponding to a "liquid tank" of the present disclosure) are detachably installed in the tank installing part 4. The four ink cartridges C store a black ink, an yellow ink, a cyan ink and a magenta ink therein, respectively.

The head unit 5 is mounted on the carriage 3 in a state that the head unit 5 has a gap defined between itself and the platen 2, and reciprocates in the scanning direction together with the carriage 3. The head unit 5 has an ink-jet head 50 (hereinafter simply referred to as the "head 50"), and four buffer tanks 60 which are provided on the upper surface of the head 50 and which temporarily store the inks to be supplied to the head 50, respectively. One ends of four ink supply tubes 17 having flexibility are detachably connected to the four buffer tanks 60, respectively. The other ends of the respective four ink supply tubes 17 are connected to the ink storing section 4. The inks inside the four ink cartridges C installed in the tank installing section 4 are supplied to the buffer tanks 60 via the four ink supply tubes 17, respectively. In the present embodiment, a channel which is constructed of each of the ink supply tubes 17 and one of the buffer tanks 60 and which is configured to supply each of the inks from the ink cartridges C to the head 50 corresponds to a "supply path" or "supply channel" of the present disclosure.

Figure 2:
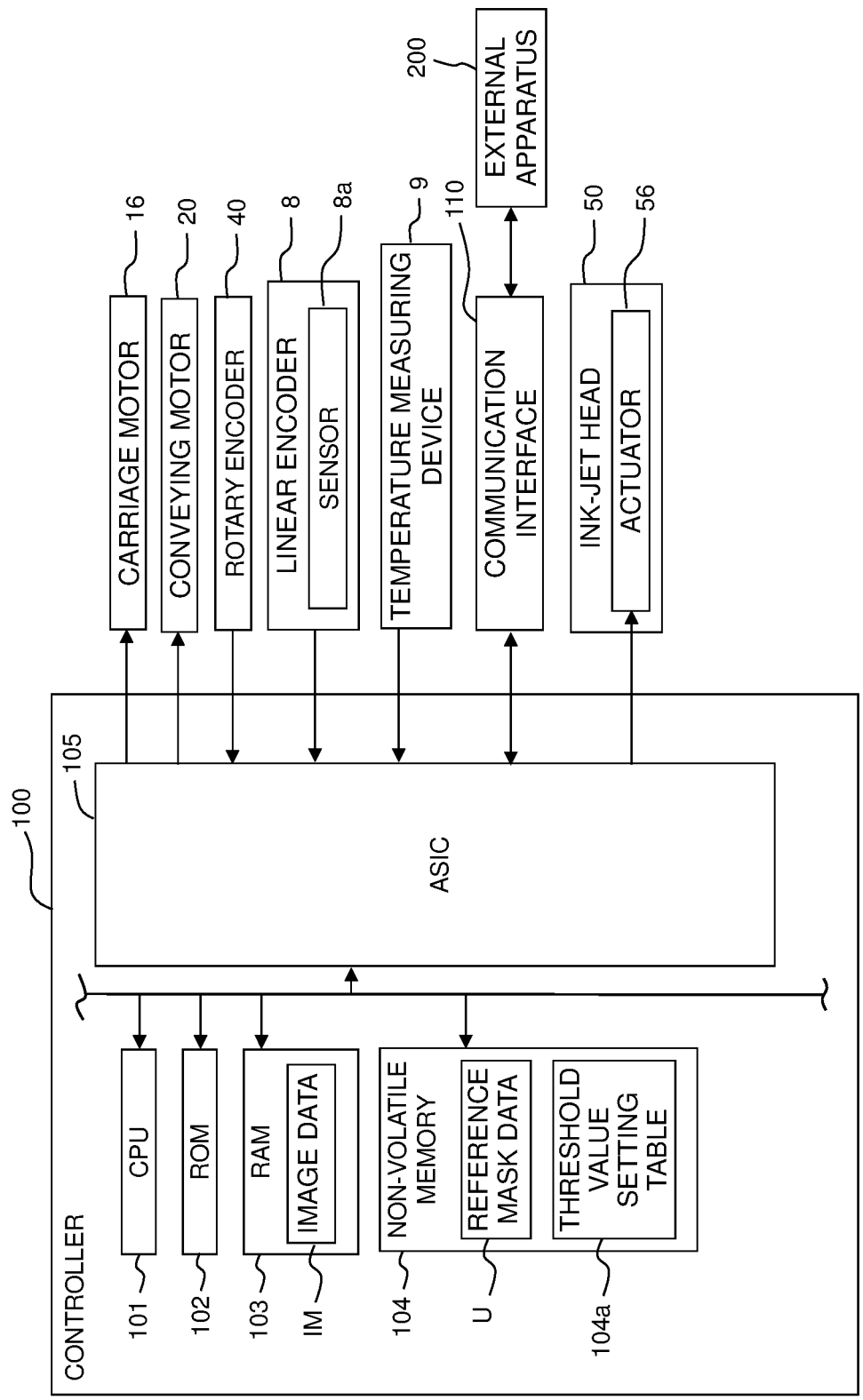
FIG. 2 is a block diagram depicting the electrical configuration of the ink-jet printer.

The head 50 has a channel unit 55 and an actuator 56 (see FIG. 2). The channel unit 55 is formed with an internal channel including a plurality of nozzles 51 which are formed in a nozzle surface 50a (see FIG. 4) as the lower surface of the channel unit 55. The internal channel is connected to the buffer tanks 60, and the plurality of nozzles 51 jet or discharge the inks supplied from the buffer tanks 60 via the internal channel. Further, a filter FT which is configured to filter out any waste, etc., in the ink is provided at a connection location at which the internal channel and each of the buffer tanks 60 are connected to each other.

The plurality of nozzles 51 are aligned in a conveyance direction (front-rear direction) orthogonal to the scanning direction at a constant nozzle interval (spacing distance) G over a length Ln to thereby form a nozzle array 52. For pieces of the nozzle array 52 are arranged side by side in the left-right direction in the nozzle surface 50*a*. From the four nozzle arrays 52, the black, yellow, cyan and magenta inks are discharged in an order from a nozzle array 52 which is included in the four nozzle arrays 52 and which is located on the rightmost side in the left-right direction. The actuator 56 is configured to generate a discharge energy for causing the ink to be discharged individually from each of the nozzles 51. For example, the actuator 56 includes (is exemplified by) an actuator configured to change the volume of a non-illustrated pressure chamber communicating with each of the nozzles 51, or configured to generate an air bubble in the inside of the pressure chamber by performing heating inside the pressure chamber, to thereby apply pressure to the ink, etc. Note that since the configuration of the actuator 56 per se is publicly known, any further and detailed explanation therefor will be omitted in the following.

The conveying mechanism 6 is provided with pairs of conveying rollers 18 and 19. The pairs of conveying rollers 18 and 19 are rotary driven by a conveying motor 20 (see FIG. 2) while being synchronized with each other. The pairs of conveying rollers 18 and 19 cooperates to convey the sheet P placed on the platen 2 in the front direction (conveyance direction). Note that the driving shafts of the pair of conveying rollers 18 are provided with a rotary encoder 40 (see FIG. 2) configured to output a pulsed signal in accordance with the rotation of the pair of conveying rollers 18. The controller 100 controls the conveyance of the sheet P based on the pulsed signal outputted from the rotary encoder 40.

The linear encoder 8 is provided with a sensor 8*a* attached to the carriage 3 and a scale 8*b* extending in the scanning direction over the movable range of the carriage 3. The scale 8*b* is provided with an index every predetermined interval (spacing distance). The sensor 8*a* detects the index provided on the scale 8*b* and outputs a detection signal of the detected index to the controller 100. With this, the controller 100 is capable of obtaining the position, the velocity, etc., of the carriage 3 based on the detection signal outputted by the linear encoder 8, and controls the movement of the carriage 3 based on a result of the obtainment.

The temperature measuring device 9 is a sensor having a thermistor, etc., and configured to measure the temperature, and measures the temperature inside the ink-jet printer 1 and outputs information regarding the temperature to the controller 100. Here, in a case that any change in the temperature occurs in the inside of the ink-jet printer 1, the temperature(s) of the ink(s) inside the ink-jet printer 1 also change(s). Namely, the temperature measuring device 9 measure the temperature inside the ink-jet printer 1 having a constant relationship with the temperature(s) of the ink(s). Note that a position or location at which the temperature measuring device 9 is arranged is not limited to or restricted by the position indicated in FIG. 1; it is allowable that the temperature measuring device 9 is arranged at a position at which the temperature measuring device 9 is capable of measuring the temperature of any part or portion, of the ink-jet printer 1, having the constant relationship with the temperature of the ink(s). Alternatively, it is allowable that the temperature measuring device 9 is configured to directly measure the temperature(s) of the ink(s).

As depicted in FIG. 2, the controller 100 includes a CPU (Central Processing Unit) 101, a ROM (Read Only Memory) 102, a RAM (Random Access Memory) 103, a non-volatile memory 104, an ASIC (Application Specific Integrated Circuit) 105, etc. The ROM 102 stores therein programs executable by the CPU 101, a variety of kinds of fixed data, etc. The RAM 103 temporality stores data (image data IM, etc.,) required in a case that a program is to be executed. The non-volatile memory 104 stores therein reference mask data U (which will be explained later on), etc. The ASIC 105 is connected to a variety of kinds of the device, unit, part, or the driving part, etc., of the ink-jet printer 1 which are exemplified, for example, by the head 50, the carriage motor 60, the conveying motor 20, a communication interface 110, etc.

Note that the controller 100 may be configured such that only the CPU 101 performs a variety of kinds of processing, or that only the ASIC 105 performs the variety of kinds of processing, or the CPU 101 and the ASIC 105 performs the variety of kinds of processing in cooperation. Alternatively, the controller 100 may be configured such that one piece of the CPU 101 solely performs the variety of kinds of processing, or that a plurality of pieces of the CPU 101 perform the variety of kinds of processing in sharing manner Still alternatively, the controller 100 may be configured such that one piece of the ASIC 105 solely performs the variety of kinds of processing, or that a plurality of pieces of the ASIC 105 perform the variety of kinds of processing in sharing manner.

Further, the controller 101 executes a recording processing of recording an image on a sheet P, by using the CPU 101 and the ASIC 105, in accordance with a program stored in the ROM 102. In the recording processing, the controller 100 controls the actuator 56 of the head 50, the carriage motor 16, the conveying motor 20, etc., based on a recording command (instruction) inputted from an external apparatus 200 such as PC (Personal Computer), etc., via the communication interface 110 so as to record an image on the sheet P. Specifically, the controller 100 records a desired image on one piece (one sheet) of the sheet P by alternately executing a recording pass of causing the ink(s) to be discharged from the nozzles 51 while moving the head 50 together with the carriage 3 in the scanning direction and a conveying operation of causing the pairs of conveying rollers 18 and 19 to convey the sheet P by a predetermined amount in the conveyance direction. As described above, the ink-jet printer 1 of the present embodiment is an ink-jet printer of the serial system.

Next, an image to be recorded in the recording pass will be explained. As depicted in FIG. 3, in a case that the controller 100 records an image, the controller 100 conveys, in a conveying operation which is performed between two continuous recording passes, the sheet P only by a length which is shorter than the length Ln of each of the nozzle arrays 52 so that a recording area K in which the image is recorded by a preceding recording pass included in the two continuous recording passes and a recording area K in which the image is recorded by a succeeding recording pass included in the two continuous recording passes partially overlap with each other. Further, in an overlap area in which the recording areas K of the two continuous recording passes overlap partially with each other, the controller 100 records the image with these two continuous recording passes, while allowing the two continuous recording pass to compliment with each other. Namely, in the overlap area F, the controller 100 records a line image corresponding to one line which is composed of a plurality of dots along the scanning direction, by a so-called multi-scan system of recording an image with (by performing) the two continuous recording passes. In this situation, the controller 100 uses different nozzles 51 in the two continuous recording passes, respectively, so as to record thinned-out images in which different parts of the line image are thinned out in the two continuous recording passes, respectively, based on a mask data (to be described later on). With this, the thinned-out images which are recorded in the two continuous recording passes, respectively, are overlapped with each other in the overlap area F to thereby complete the line image.

As described above, by partially overlapping the recording areas K of the two continuous recording passes and by recording the image with the multi-scan system in the overlap area F, it is possible to suppress any occurrence of the degradation in the image quality, such as a white streak and/or unevenness in the density extending along the scanning direction, at a joint area of the images of the two continuous recording passes, which would be otherwise caused due to any shift or deviation in the landing positions in the conveyance direction of the ink. Note that in the following description, in a case of discriminating or distinguishing, regarding the recording area K, as to the image is recorded by a recording pass of which ordinal number, the recording area is indicated, for example, as a "recording area $K_N$" in such a case that the image is recorded by a Nth recording pass (recording pass of which ordinal number is N). Further, in the recorded image, there are consequently a plurality of overlap areas F. In the following, among the plurality of overlap areas F, an overlap area F of the recording area $K_N$ and a recording area $K_{N+1}$, is referred to as an "overlap area $F_N$".

In the head 50, in a case that the ink is discharged from a certain nozzle 51 among the plurality of nozzles 51, the pressure of the ink in a part, of the inner channel, communicating with the certain nozzle 51 is decreased. Normally, in response to the decrease in the pressure in the part of the internal channel, the ink flows into the internal channel from the ink cartridge C, and thus the pressure of the ink inside the internal channel is restored as time passes. However, in a case that a state in which the ink is discharged from a large number of the nozzles 51 at a time during execution of the recording pass is lasted or continued, a discharge amount of the ink discharged within a predetermined period of time is increased. As a result, the discharge amount of the ink per unit time from the head 50 becomes greater than a supply amount of the ink to the head 50 per unit time, thereby leading to such a fear that any short supply of the ink to the head 50 (under-refill) might occur. Further, in a case that such the short supply of the ink occurs as described above, there is such a fear that the ink might not be normally discharged from the nozzle 51.

In view of this situation, in a case that there is no fear that any short supply of the ink might occur during the execution of a certain recording pass, the controller 100 determines a moving velocity of the carriage 3 (hereinafter referred to as a "carriage velocity") in the certain recording pass to be a normal velocity (corresponding to a "first moving velocity" of the present disclosure). On the other hand, in a case that there is any fear that any short supply of the ink might occur during the execution of the certain recording pass, the controller 100 determines the carriage velocity in the certain recording pass to be a low velocity (corresponding to a "second moving velocity" of the present disclosure) which is slower than the normal velocity. With this, since a length of one recording period becomes long (an discharging interval of the ink becomes long), it is possible to suppress such a situation that the discharge amount of the ink from the head 50 per unit time becomes greater than the supply amount of the ink to the head 50 per unit time. Note that one recording period is a time required for the head 50 to move only by a unit distance corresponding to the resolution in the scanning direction of an image to be recorded on the sheet P. In the following, a processing performed by the controller 100 as a countermeasure for the short supply of the ink will be explained specifically.

Note that among the four color inks, the black ink normally has a high viscosity and is discharged in a large discharge amount per unit time during the execution of recording pass, as compared with the other color inks. Accordingly, the short supply of the black ink tends to occur easily, as compared with the other color inks.

In view of this situation, in the present embodiment, the controller 100 calculates and obtains a duty (corresponding to "information regarding a liquid discharge amount of the liquid" of the present disclosure) in a case of executing of the recording pass, based on the image data IM stored in the RAM 103. The term "duty" means a ratio of an actual discharge amount of the black ink which is actually discharged in a certain recording pass to a maximum discharge amount (duty 100%) of the black ink discharged from all the nozzles which discharge the black ink in the certain recording pass.

In a case that the obtained duty in the certain recording pass is less than a threshold value, the controller 100 determines that there is no fear that the short supply of the ink might occur, and determines the carriage velocity in the certain recording pass to be the normal velocity. On the other hand, in a case that the obtained duty in the certain recording pass is not less than the threshold value, the controller 100 determines that there is a fear that the short supply of the ink might occur, and determines the carriage velocity in the certain recording pass to be the low velocity. As a modification, it is allowable that the controller 100 calculates the duty, in the case of executing the certain recording pass, for each of the four color inks; and that in a case that the duty in at least any one of the four color inks is not less than the threshold value, the controller 100 determines the carriage velocity in the certain recording pass to be the low velocity.

Note that in the present embodiment, the threshold value which is compared with the duty is not a fixed value, and is a value which is adjusted in accordance with a temperature indicated by temperature information outputted from the temperature measuring device 9. Specifically, the non-volatile memory 104 stores therein a threshold value setting table 104a indicating the relationship between the temperature indicated by the temperature information outputted from the temperature measuring device 9 and the threshold value. Further, the controller 100 determines a threshold value which corresponds, in the threshold value setting table 104a, to the temperature indicated by the temperature information outputted from the temperature measuring device 9, as a threshold value which is to be compared with the duty. Here, the viscosity of the ink is lower and the flow resistance of the ink is lower, as the temperature of the ink becomes higher. Accordingly, as the temperature of the ink is higher, the ink flows more easily and the short supply of the ink is less likely to occur. Therefore, the threshold value setting table 104a is set such that as a temperature indicated by the temperature information outputted from the temperature measuring apparatus 9 is higher, the value of the threshold value corresponding to the temperature becomes greater. As described above, since the threshold value is adjusted in accordance with the temperature of the ink, it is possible to make determination, highly precisely, as to whether or not there is such a fear that the short supply of the ink might occur. In the present embodiment, the "information regarding a supply state of the liquid from the liquid tank to the head" corresponds to information including the duty and the temperature information outputted from the temperature measuring device 9.

In the present embodiment, by determining the carriage velocity in each of the recording passes, selectively between the normal velocity and the low velocity as described above, there is such a possibility that, in a plurality of recording passes which are executed in a case of recording an image on one sheet of the sheet P, a recording pass wherein the carriage velocity is the normal velocity and a recording pass wherein the carriage velocity is the low velocity are present in a mixed manner. In view of this situation, the disclosing person of the present disclosure found out that in a case that there are the recording pass wherein the carriage velocity is the low velocity and the recording pass wherein the carriage velocity is the normal velocity are present in a mixed manner, there is such a possibility that the quality of the image recorded on the sheet P might be degraded. An explanation for this possibility will be given specifically in the following.

Figure 4A:
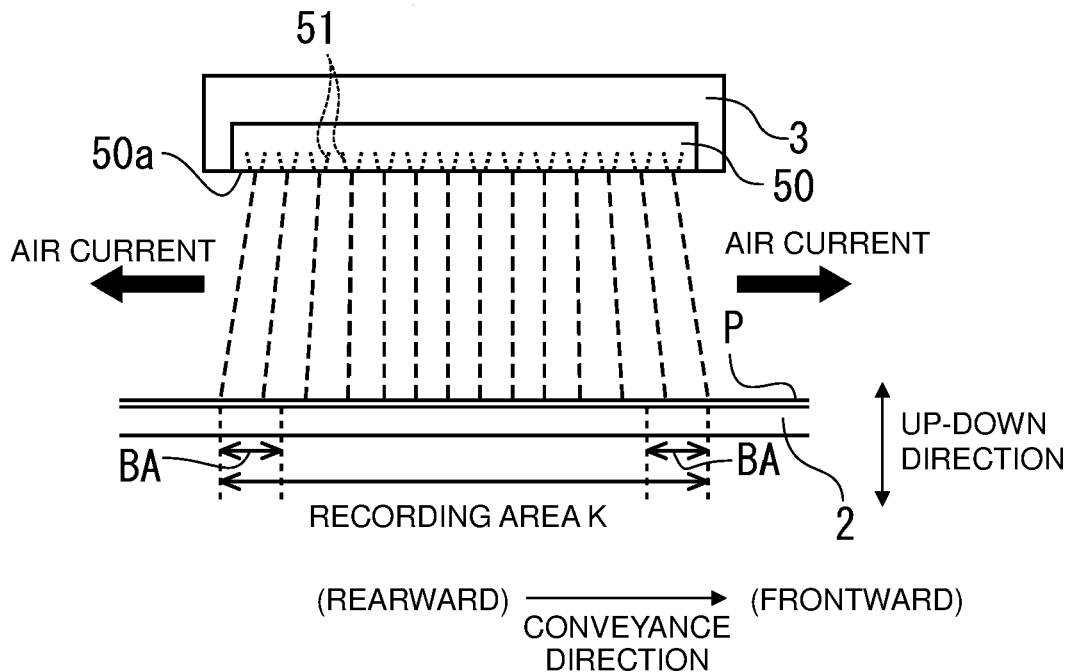
FIG. 4A is a view explaining spread in the conveyance direction of the recording area in a case that the carriage velocity is the normal velocity.
Figure 4B:
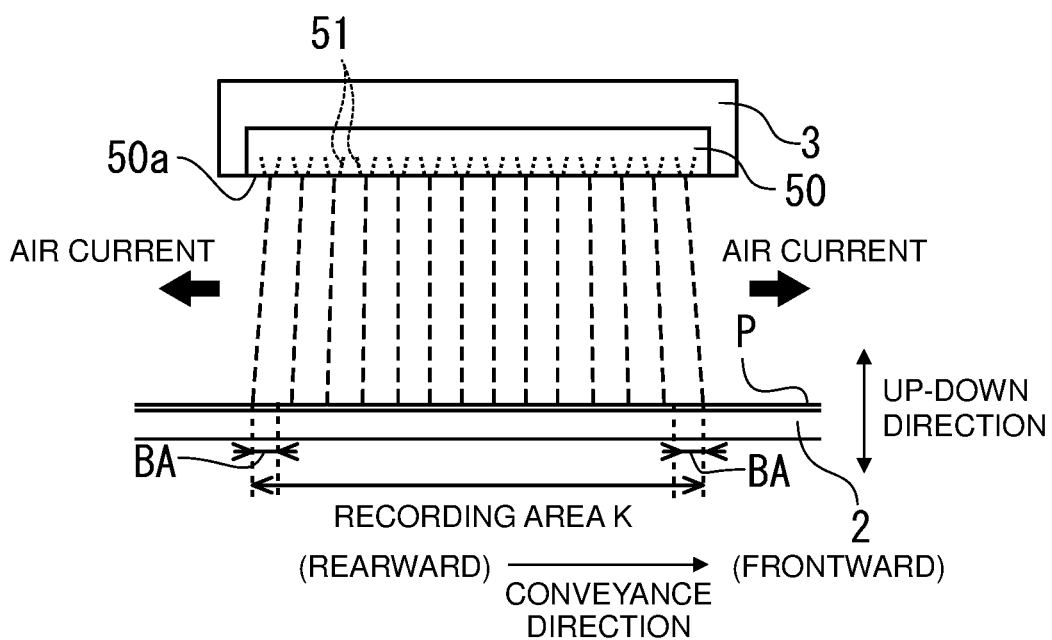
FIG. 4B is a view explaining spread in the conveyance direction of the recording area in a case that the carriage velocity is the low velocity.

The disclosing person of the present disclosure found out that as the carriage velocity during the execution of the recording pass is faster, a landing area (recording area K) of the ink on the sheet P spreads more (to a greater extent) in the conveyance direction, as depicted in FIGS. 4A and 4B. The main factor causing this spread of the recording area K in the conveyance direction is considered as follows. Namely, in a case that the carriage 3 is moved, any passing wind is generated in the vicinity of the carriage 3 due to the movement of the carriage 3. In this situation, passing wind passing immediately below the carriage 3 and passing winds passing on the both outer sides in the conveyance direction of the carriage 3 have mutually different wind speeds or velocities (flow rates). As a result, any difference in the pressure (pressure difference) is generated between the location immediately below the carriage 3 and the locations on the both outer sides in the conveyance direction of the carriage 3, which in turn generates an air current flowing from immediately below the carriage 3 toward the both outer sides in the conveyance direction of the carriage 3. It is considered that the ink, jetted or discharged from the nozzles 51 formed on the both end parts in the conveyance direction of the head 50, is affected by this air current and thus are caused to flow toward the outer sides in the conveyance direction, thereby causing the recording area K to spread in the conveyance direction. In addition, as the carriage velocity is faster, the pressure difference generated between the location immediately below the carriage 3 and the locations on the both outer sides in the conveyance direction of the carriage 3 becomes greater, which in turn makes the air current flowing from immediately below the carriage 3 toward the outer sides in the conveyance direction to be stronger. Accordingly, it is considered that as the carriage velocity is faster, the recording area K spreads more in the conveyance direction.

Note that the ink discharged from certain nozzles 51 formed on the both end parts in the conveyance direction of the head 50 is affected by the above-described air current and the landing positions of the ink discharged from the certain nozzles 51, respectively, are consequently deviated toward the outer side in the conveyance direction from ideal landing positions thereof, respectively. On the other hand, the ink discharged from other nozzles 51 formed at a central part in the conveyance direction of the head 50 is hardly affected by the above-described air current, and thus the landing positions of the ink discharged from the other nozzles 51 are hardly deviated from the ideal positions thereof, respectively. Namely, as the ink is discharged from nozzles 51 formed at locations more closer to the both end parts, respectively, in the conveyance direction of the head 50, the landing positions of the ink discharged from these nozzles 51 are consequently deviated more from the ideal landing positions thereof toward the both sides, respectively, in the conveyance direction, as compared with the ink discharged from other nozzles 51 formed in the central part in the conveyance direction. As a result, on the both end parts in the conveyance direction of the recording area K, the landing amount of the ink per unit area is smaller, as compared with that in the central part of the conveyance direction. Accordingly, as the spread in the conveyance direction of the recording area K becomes greater, an area BA in which the landing amount of the ink per unit area is less than a predetermined amount becomes greater at each of the both end parts in the conveyance direction of the recording area K.

Accordingly, as depicted in FIGS. 4A and 4B, a recording area K of the recording pass of which carriage velocity is the normal velocity is affected by the air current and spreads more in the conveyance direction, as compared with a recording area K of the recording pass of which carriage velocity is the low velocity. Further, an area (size, dimension) of the area BA, in which the landing amount of the ink per unit area is less than the predetermined amount, in the recording area K of the recording pass of which carriage velocity is the normal velocity is greater than an area of the area BA in the recording area K of the recording pass of which carriage velocity is the low velocity.

From the above-described phenomena, in a case that a recording pass of which carriage velocity is the normal velocity and another recording pass of which carriage velocity is the low velocity are present in a mixed manner during the recording performed to record an image on one pieces of the sheet P, there is such a fear that any streak-like unevenness in density along the scanning direction might be generated due to the difference in the spread in the conveyance direction of the recording area K between these recording passes. Namely, in such a case that the sheet P is conveyed uniformly in a constant amount in each of the conveyance operations executed during the two continuous recording passes, respectively, there is such a fear that an area in which the landing amount per unit area of the ink is smaller (so-called white streak) than another area might be generated along the scanning direction at a boundary or joint part of the recording areas K of the two continuous recording passes. Specific explanation therefor will be given in the following.

Figure 4C:
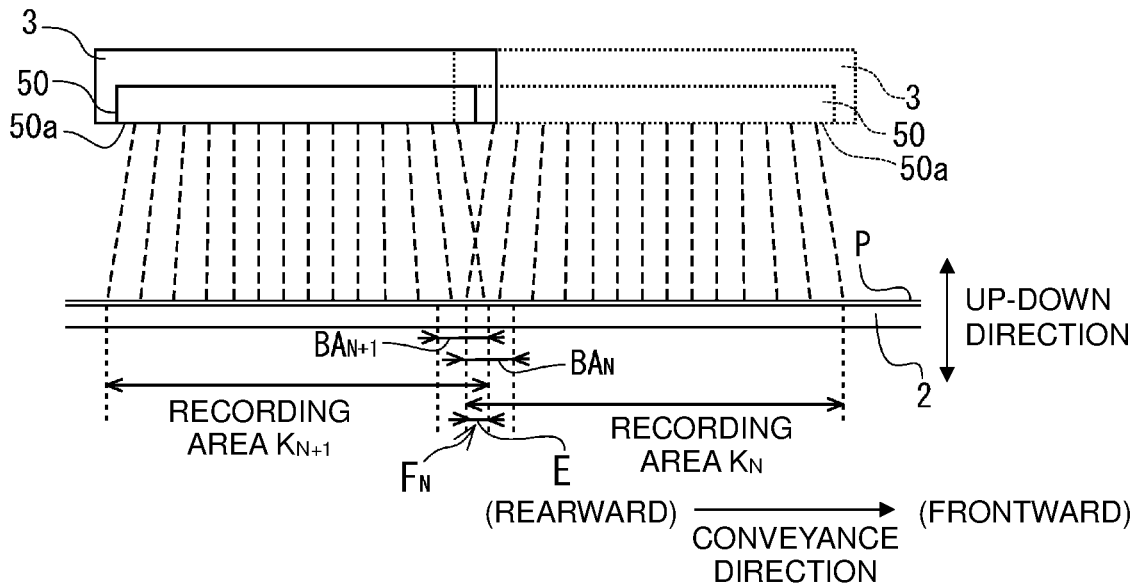
FIGS. 4C and 4D are each a view explaining a length in the conveyance direction (conveyance length) of an overlap area according to the two continuous recording passes.

In a case that an area BA of one recording pass included in the two continuous recording passes overlaps with an area BA of the other recording pass included in the two continuous recording passes, the landing amount per unit area of the ink is consequently increased at an overlap area F of these areas BA. Namely, in a case that the entirety of each of the recording areas BA belongs to the overlap area F of the two continuous recording passes, it is possible to make the unevenness in density to hardly occur. However, for example as depicted in FIG. 4C, in a case that carriage velocities determined regarding the Nth recording pass and the N+1th recording pass are both the normal velocity and that a length E in the conveyance direction (hereinafter referred to as a "conveyance length E") of an overlap area $F_N$ is short, a part of the area $BA_N$ according to the recording area $K_N$ and a part of the area $BA_{N+1}$ according to the recording area $K_{N+1}$ both do not belong to the overlap area F, and consequently, a white streak is generated in this part or location.

Figure 4D:
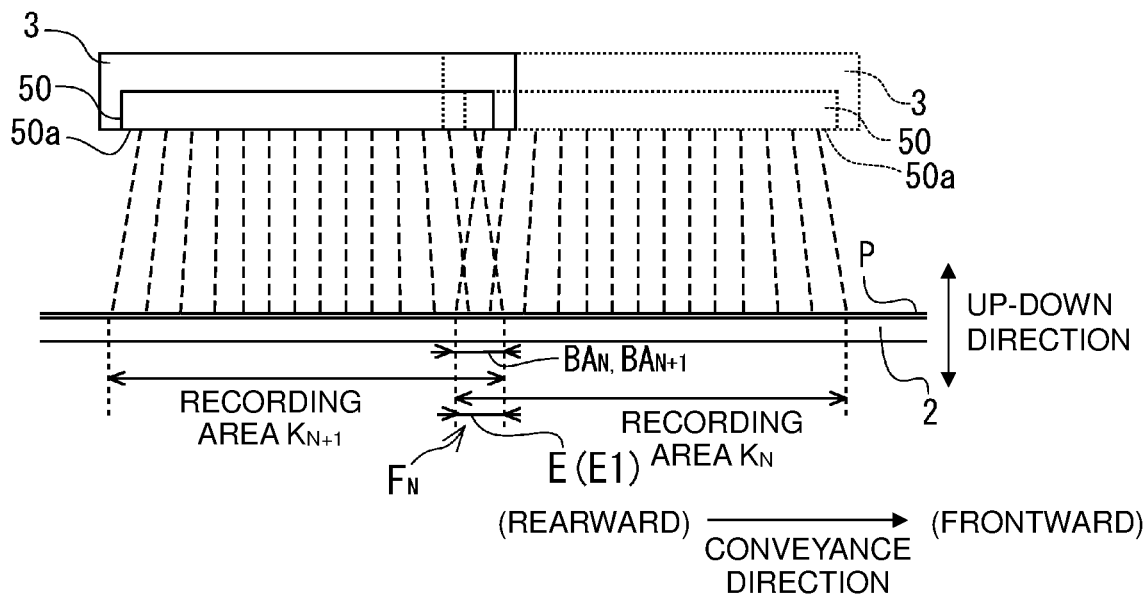

Here, in such a case, as indicated in FIG. 4D, that the carriage velocities determined regarding the Nth recording pass and the N+1th recording pass are both the normal velocity and that the length E in the conveyance direction of an overlap area $F_N$ (hereinafter referred to as "conveyance length E") is determined to be such a length (hereinafter referred to as "length E1") that the area $BA_N$ according to the recording area $K_N$ and the area $BA_{N+1}$ according to the recording area $K_{N+1}$ completely overlap with each other, it is possible to cause the white streak to be hardly generated. Namely, in such a case that the sheet P is conveyed uniformly in such a conveyance amount that makes the conveyance length E of the overlap area F to be the length E1 in each of the conveyance operations executed between the two continuous recording passes, it is possible to make the unevenness in density to hardly occur. However, in a case that the conveyance length E in each of the overlapped areas F is made to be longer, a number of times of the recording pass to be executed to record an image on one piece of the sheet P is increased, thus creasing such a problem that a time required for the recording processing becomes longer.

Note that, for example, in such a case that the carriage velocities determined with respect to the Nth and N+1th recording passes are both the low velocity, the length in the conveyance direction of each of the area $BA_N$ according to the recording area $K_N$ and the area $BA_{N+1}$ according to the recording area $K_{N+1}$ is short, as compared with the case that the determined carriage velocities are both the normal velocity. Accordingly, in a case that the carriage velocities determined with respect to the Nth and N+1th recording passes are both the low velocity, it is possible to suppress the occurrence of the unevenness in density even if the conveyance length E of the overlap area F is shorter than the length E1.

In view of the foregoing situations, in the present embodiment, a conveyance amount by which the sheet P is conveyed in the conveyance operation is adjusted so that the conveyance length E of the overlap area $F_N$ of the recording area $K_N$ of the Nth recording pass and the recording area $K_{N+1}$ of the N+1th recording pass is adjusted based on the carriage velocity determined with respect to the Nth recording pass and the carriage velocity determined with respect to the N+1th recording pass. To provide a more detailed explanation, there are three kinds of length, namely length E1, length E2 and length E3, which are settable as the conveyance length E of the overlap area F. Among the three kinds of the conveyance length E, the length E1 is the longest, and the length E2 is the shortest. Namely, in the three kinds of the length E, the lengths are longer in a descending order of: the length E1, the length E3 and the length E2. The length E1 corresponds to "first length" of the present disclosure, the length E2 corresponds to "second length" of the present disclosure, and the length E3 corresponds to "third length" of the present disclosure.

Figure 3A:
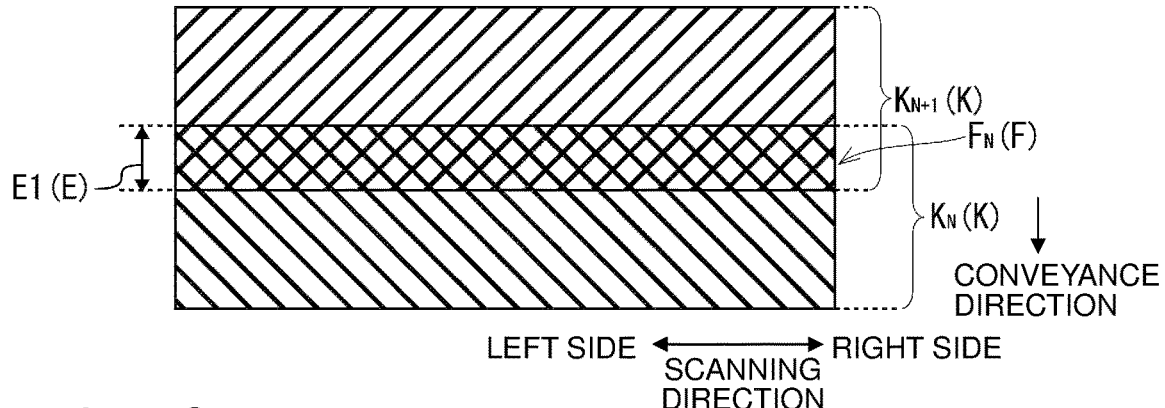
Figure 3B:
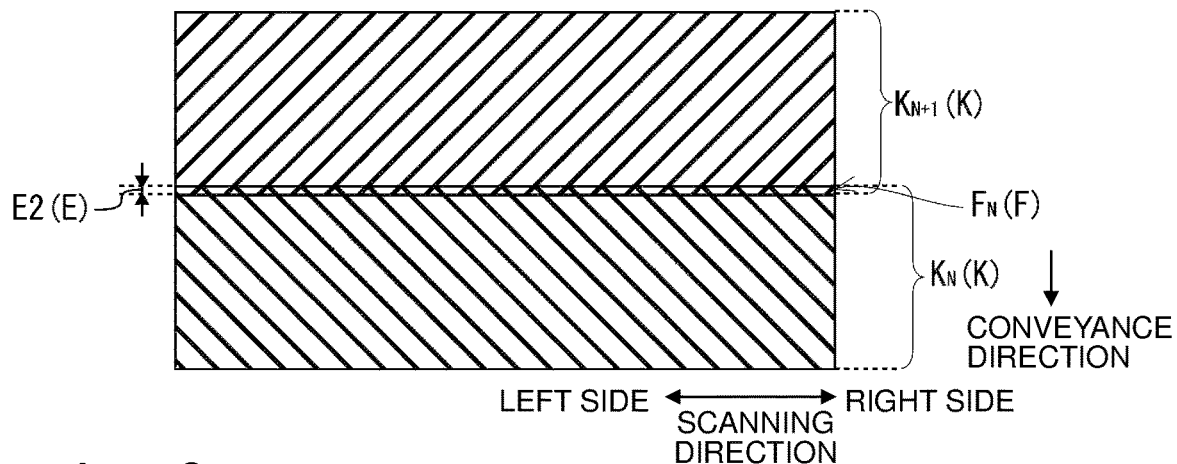

Further, as depicted in FIG. 3A, in a case that the carriage velocities determined with respect to the Nth and N+1th recording passes, respectively, are both the normal velocity, the conveyance length E of the overlap area $F_N$ is set to the length E1. Furthermore, as depicted in FIG. 3B, in a case that the carriage velocities determined with respect to the Nth and N+1th recording passes, respectively, are both the low velocity, the conveyance length E of the overlap area $F_N$ is set to the length E2. The length E2 is such a length that, in the case that the carriage velocities determined with respect to the Nth recording pass and the N+1th recording pass are both the low velocity, the area $BA_N$ according to the recording area $K_N$ and the area $BA_{N+1}$ according to the recording area $K_{N+1}$ overlap completely with each other. Note that the ideal length for each of the length E1 and the length E2 is such a length that the area $BA_N$ and the area $BA_{N+1}$ overlap completely with each other. Namely, the ideal length for each of the length E1 and the length E2 is such a length that is same as one of the length in the conveyance direction of the area $BA_N$ and the length in the conveyance direction of the area $BA_{N+1}$. However, each of the length E1 and the length E2 is allowed to be a length in which any error with respect to the ideal length is within an allowable range. For example, each of the length E1 and the length E2 is allowed to have an error to such an extent that cannot be visually observable (for example, approximately ±60 μm), with respect to one of the length in the conveyance direction of the area $BA_N$ and the length in the conveyance direction of the area $BA_{N+1}$. Further, for example, each of the length E1 and the length E2 is allowed to have an error to such an extent that any unevenness in density occurring due to the error is visually unobservable to an user, even if the area $BA_N$ and the area $BA_{N+1}$ do not completely overlap with each other.

Figure 3C:
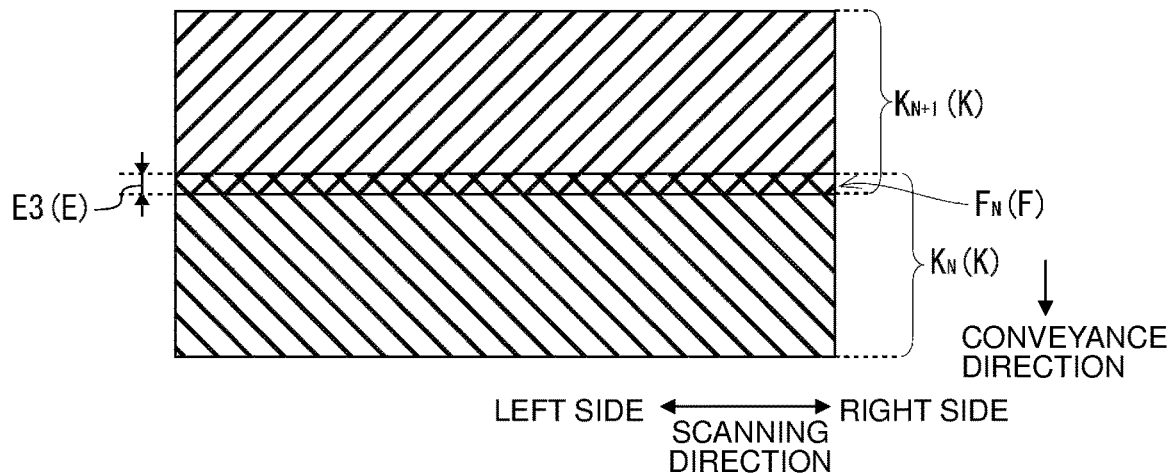

On the other hand, in a case that the carriage velocity determined with respect to either one of the Nth and N+1th recording passes is the normal velocity and that the carriage velocity determined with respect to the other of the Nth and N+1th recording passes is the low velocity, the conveyance length E of the overlap area $F_N$ is set to the length E3, as depicted in FIG. 3C. In this case, a part of the area BA of the recording pass in which the carriage velocity is the normal velocity does not consequently belong to the overlap area F, whereas the entirety of the area BA of the recording pass in which the carriage velocity is the low velocity consequently belongs to the overlap area F. As a result, it is possible to reduce, on the sheet P, an area in which the landing amount per unit area of the ink is less than the predetermined amount.

Next, an explanation will be given about mask data used in each of the recording passes. Reference mask data U is stored in the non-volatile memory 104. The reference mask data U is mask data with respect to the recording area K in a case that the conveyance length E of the overlap area F is half the length Ln of the nozzle array 52 [Ln/2].

Figure 5:
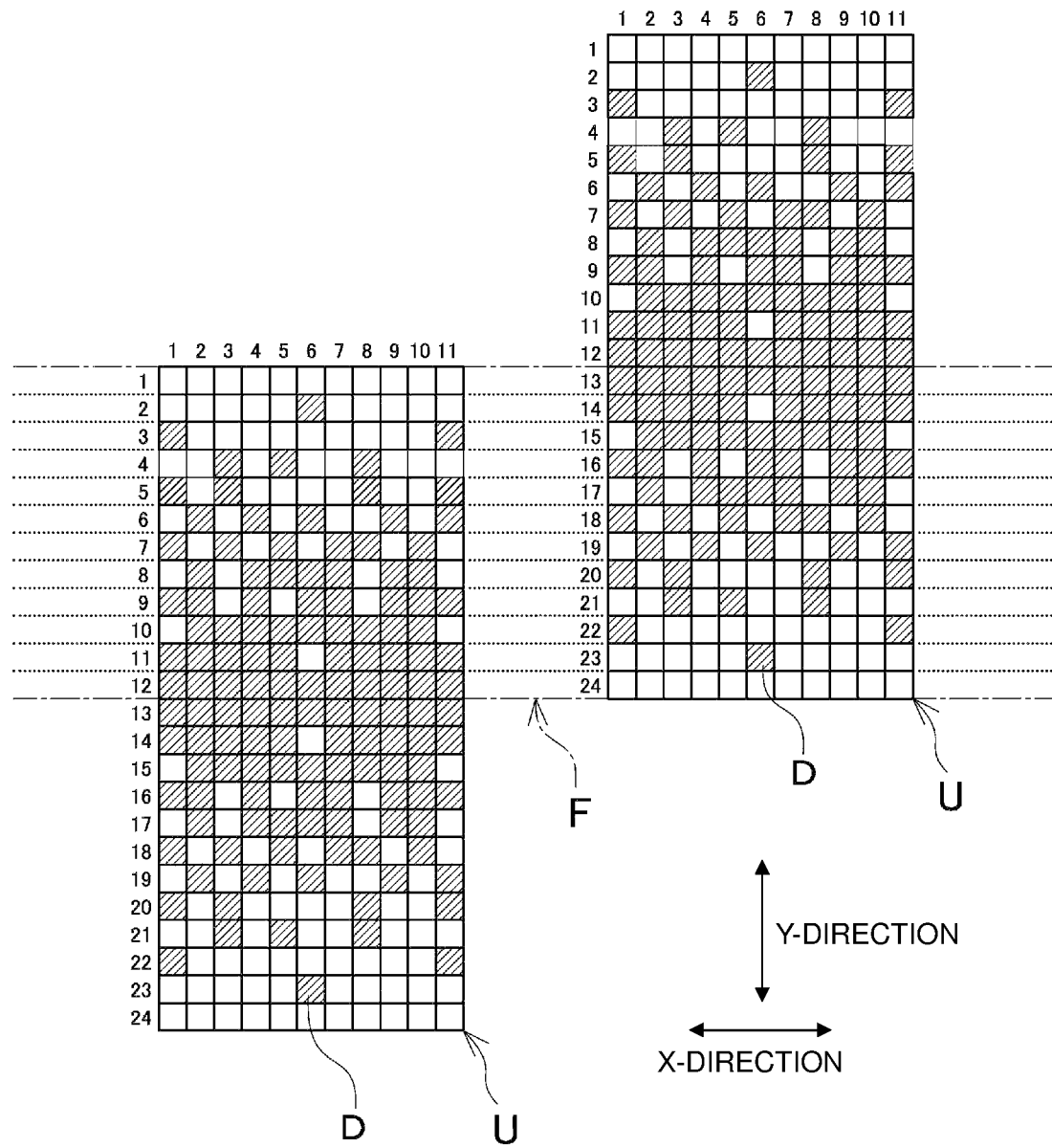
FIG. 5 is a view explaining reference mask data and the corresponding relationship between the reference mask data and the overlap area.

The reference mask data U is, for example, formed of a plurality pieces of dot data D which are arranged in a grid-like manner in a X-direction and a Y-direction which are orthogonal to each other, as depicted in FIG. 5. In FIG. 5, an example of the reference mask data U is depicted provided that, for the sake of convenience, the number of the nozzle 51 constructing the nozzle array 52 are twenty four (Ln=24×G). The X-direction and the Y-direction correspond to the scanning direction and the conveyance direction, respectively. In FIG. 5, reference numerals 1, 2, 3, ... 10, 11 which are arranged side by side in the X-direction correspond to ordinal numbers of the dots (indicate as to the dots have which ordinal numbers), respectively, from the left side in the scanning direction of a line image. Specifically, dot data D which is I-th from the left side in the X-direction (I=1, 2, ... 10, 11) corresponds to [I+(11×C)]th dot (C=0, 1, 2, ...) from the left side in the scanning direction of the line image. Further, in FIG. 5, reference numerals 1, 2, 3, ... 23, 24 which are arranged side by side in the Y-direction indicate as to the nozzles 51 have which ordinal numbers, respectively, from the upstream side in the conveyance direction. Furthermore, in FIG. 5, a plurality of pieces of dot data D which are hatched mean that the discharge of ink from the nozzles 51 (formation of dots) based on the image data IM are allowed, whereas a plurality of pieces of dot data D which are not hatched mean that the discharge of ink from the nozzles 51 based on the image data IM are inhibited (these pieces of dot are thinned out).

Further, in the reference mask data U, a ratio of dot data D (dot data D to which the hatching is applied) allowing the discharge of the ink is greater as an array of dot data D is located closer to the central side in the Y-direction. Furthermore, in the reference mask data U, with respect to two arrays of the dot data D which are separated from each other with other twelve arrays of the dot data D intervened therebetween in the Y-direction (for example, in an array "1" of the dot data D and an array "13" of the dot data D in the Y-direction), the arrangements of dot data D allowing the discharge of the ink and another dot data D inhibiting the discharge of the ink are made to be reverse. With this, a thinned-out image recorded by thinning out the dot(s), from the above-described line image, based on one of the two arrays of the dot data D and another thinned-out image recorded by thinning out the dot(s), from the above-described line image, based on the other of the two arrays of the dot data D are overlapped with each other to thereby complete the above-described line image.

An actual conveyance length E of the overlap area $F_N$ is shorter than the length [Ln/2](=12×G) that is half the length Ln of the nozzle array 52. Corresponding to this situation, in the recording performed in the multi-scan system, a data part corresponding to the overlap area $F_N$ among the mask data of the recording area $K_N$ and the mask data of the recording area $K_{N+1}$ is determined by using, from the plurality of arrays of the dot data D constructing the reference mask data U, every [(Ln/2)/E] arrays of the dot data D, from the upstream side in the conveyance direction. More specifically, an upstream half part in the conveyance direction of these arrays of the dot data D is determined as the data part corresponding to the overlap area $F_N$ among the mask data with respect to the recording area $K_N$; and a downstream half part in the conveyance direction of these arrays of the dot data D is determined as the data part with respect to the overlap area $F_{N+1}$ among the mask data constructing the recording area $K_{N+1}$. In the following, for the sake of convenience of the explanation, the length E1, the length E2 and the length E3 of the conveyance length E of the overlap area F are made to be a length four times the nozzle interval G, a length two times the nozzle interval G, and a length three times the nozzle interval G, respectively.

Figure 6A:
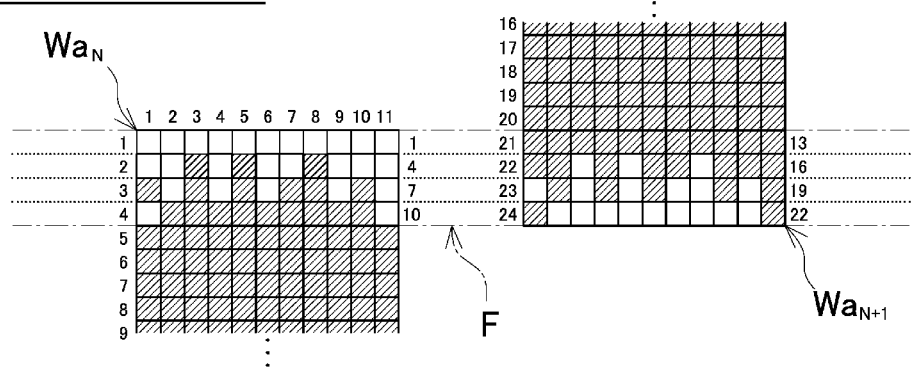

For example, in a case that the length E of the overlap area F is the length E1 which is four times the nozzle interval G; among eight arrays of the dot data D constructing the reference mask data U and which are every three (=[12×G]/[4×G]) arrays of the dot data D from the upstream side in the conveyance direction (for example, 1st, 4th, 7th, 10th, 13th, 16th, 19th and 22nd arrays of the dot data D from the upstream side in the conveyance direction), four arrays among these eight arrays of the dot data which are disposed on the upstream side in the conveyance direction are determined as a data part corresponding to the overlap area $F_N$ among a mask data $Wa_N$ with respect to the recording area $K_N$, as depicted in FIG. 6A. Further, among these eight arrays of the dot data D, four arrays which are disposed on the downstream side in the conveyance direction are determined as a data part corresponding to the overlap area $F_N$ among a mask data $Wa_{N+1}$ with respect to the recording area $K_{N+1}$, as depicted in FIG. 6A.

Figure 6B:
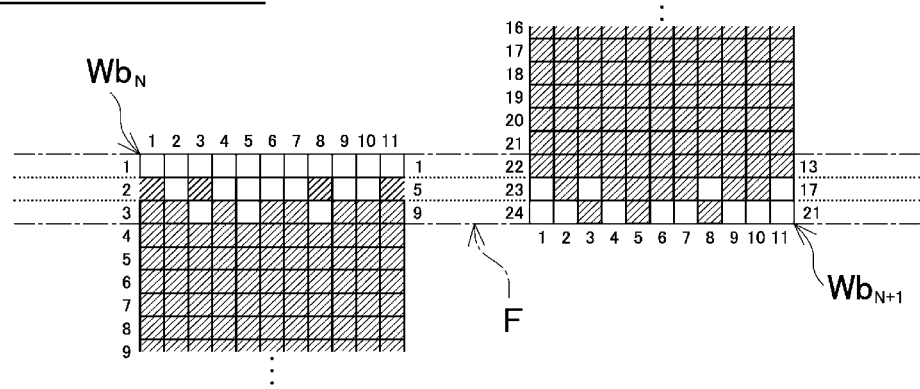

Similarly, for example, in a case that the length E of the overlap area F is the length E3 which is three times the nozzle interval G; among six arrays of the dot data D constructing the reference mask data U and which are every four (32 [12×G]/[3×G]) arrays of the dot data D from the upstream side in the conveyance direction (for example, 1st, 5th, 9th, 13th, 17th and 21st arrays of the dot data D from the upstream side in the conveyance direction), three arrays among these six arrays of the dot data which are disposed on the upstream side in the conveyance direction are determined as a data part corresponding to the overlap area $F_N$ among a mask data $Wb_N$ with respect to the recording area $K_N$, as depicted in FIG. 6B. Further, among these six arrays of the dot data D, three arrays which are disposed on the downstream side in the conveyance direction are determined as a data part corresponding to the overlap area $F_N$ among a mask data $Wb_{N+1}$ with respect to the recording area $K_{N+1}$, as depicted in FIG. 6B.

Figure 6C:
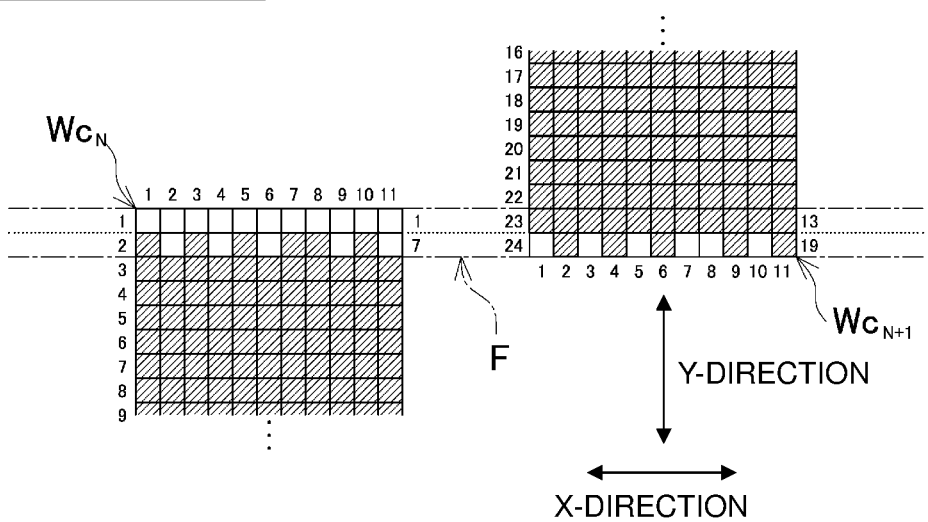
FIG. 6C depicts a case that the conveyance length of the overlap area is a length E2.

Similarly, for example, in a case that the length E of the overlap area F is the length E2 which is two times the nozzle interval G; among four arrays of the dot data D constructing the reference mask data U and which are every six (=[12×G]/[2×G]) arrays of the dot data D from the upstream side in the conveyance direction (for example, 1st, 7th, 13th and 19th arrays of the dot data D from the upstream side in the conveyance direction), two arrays among these four arrays of the dot data which are disposed on the upstream side in the conveyance direction are determined as a data part corresponding to the overlap area $F_N$ among a mask data $Wc_N$ with respect to the recording area $K_N$, as depicted in FIG. 6C. Further, among these four arrays of the dot data D, two arrays which are disposed on the downstream side in the conveyance direction are determined as a data part corresponding to the overlap area $F_N$ among a mask data $Wc_{N+1}$ with respect to the recording area $K_{N+1}$, as depicted in FIG. 6C.

Furthermore, as depicted in FIGS. 6A to 6C, a data part, of the mask data, corresponding to an area which is different from the overlap area F in the recording area K is formed by arrays of the dot data D wherein all of the dot data D is dot data D allowing the discharge of the ink (hatched dot data D).

Here, reference numerals 1 to 24 affixed to the left side of the mask data $Wa_N$, the mask data $Wa_{N+1}$, the mask data $Wb_N$, the mask data $Wb_{N+1}$, the mask data $Wc_N$, the mask data $WC_{N+1}$ each indicate the correspondence to the nozzle 51 of which ordinal number from the upstream side in the conveyance direction; and reference numerals affixed to the right side (for example, the reference numerals "1", "7", "13" and "19" in FIG. 6C) of the mask data $Wa_N$, the mask data $Wa_{N+1}$, the mask data $Wb_N$, the mask data $Wb_{N+1}$, the mask data $Wc_N$, the mask data $WC_{N+1}$ each indicate the correspondence of the array of the dot data D, of the reference mask data U, to the nozzle 51 of which ordinal number from the upstream side in the conveyance direction.

Further, by performing the recording with the two continuous recording passes based on the above-described mask data, an array of the dot data D allocated to the nozzles 51, respectively in one of the two continuous recording passes and an array of the dot data D allocated to the nozzles 51, respectively, in the other of the two continuous recording passes become two arrays of the dot data D which are separated from each other with twelve arrays of the dot data D intervened therebetween in the conveyance direction in the reference mask data U, with respect to the image of each of the line images in the overlap area F. Namely, the line image is completed by overlapping thinned-out images recorded by these two continuous recording passes.

As described above, in the reference mask data U, the ratio of the dot data D allowing the discharge of the ink is greater as an array of dot data D is located closer to the central side in the Y-direction. Accordingly, also with respect to the mask data $Wa_N$, the mask data $Wa_{N+1}$, the mask data $Wb_N$, the mask data $Wb_{N+1}$, the mask data $Wc_N$ and the mask data $WC_{N+1}$ each of which is generated based on the reference mask data U, the ratio of the dot data D allowing the discharge of the ink is greater as an array of dot data D is located closer to the central side in the Y-direction. Therefore, in the recording pass, the ratio of ink discharge (from the nozzles 51) is greater for nozzles 51 which are formed on the central side in the conveyance direction of the head 50. Namely, in the recording pass, the ratio of ink discharge (from the nozzles 51) is smallest for nozzles 51 which are formed both on the outer sides in the conveyance direction of the head 50 wherein an amount of the shift or deviation (deviation amount) in the landing positions of the ink due to the effect of the air current generated accompanying with the movement of the carriage 3 becomes the greatest. As a result, it is possible to suppress any occurrence of the streak-like unevenness in density along the scanning direction which would be otherwise caused due to the deviation in the landing positions of the ink discharged from the nozzles 51 formed both on the outer sides in the conveyance direction of the head 50.

Figure 7A:
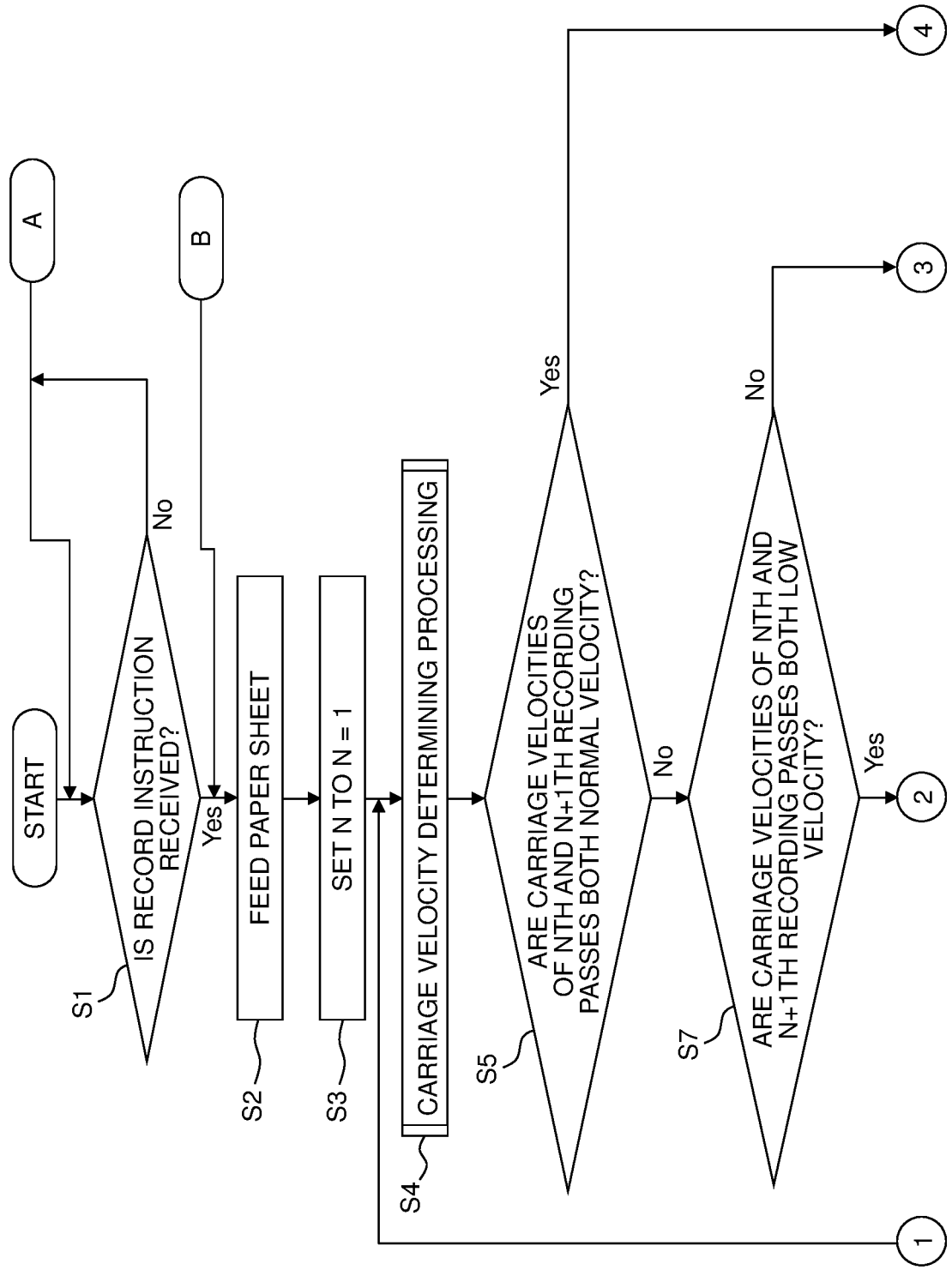
FIGS. 7A and 7B depict a flow chart indicating an operation of the ink-jet printer.
Figure 7B:
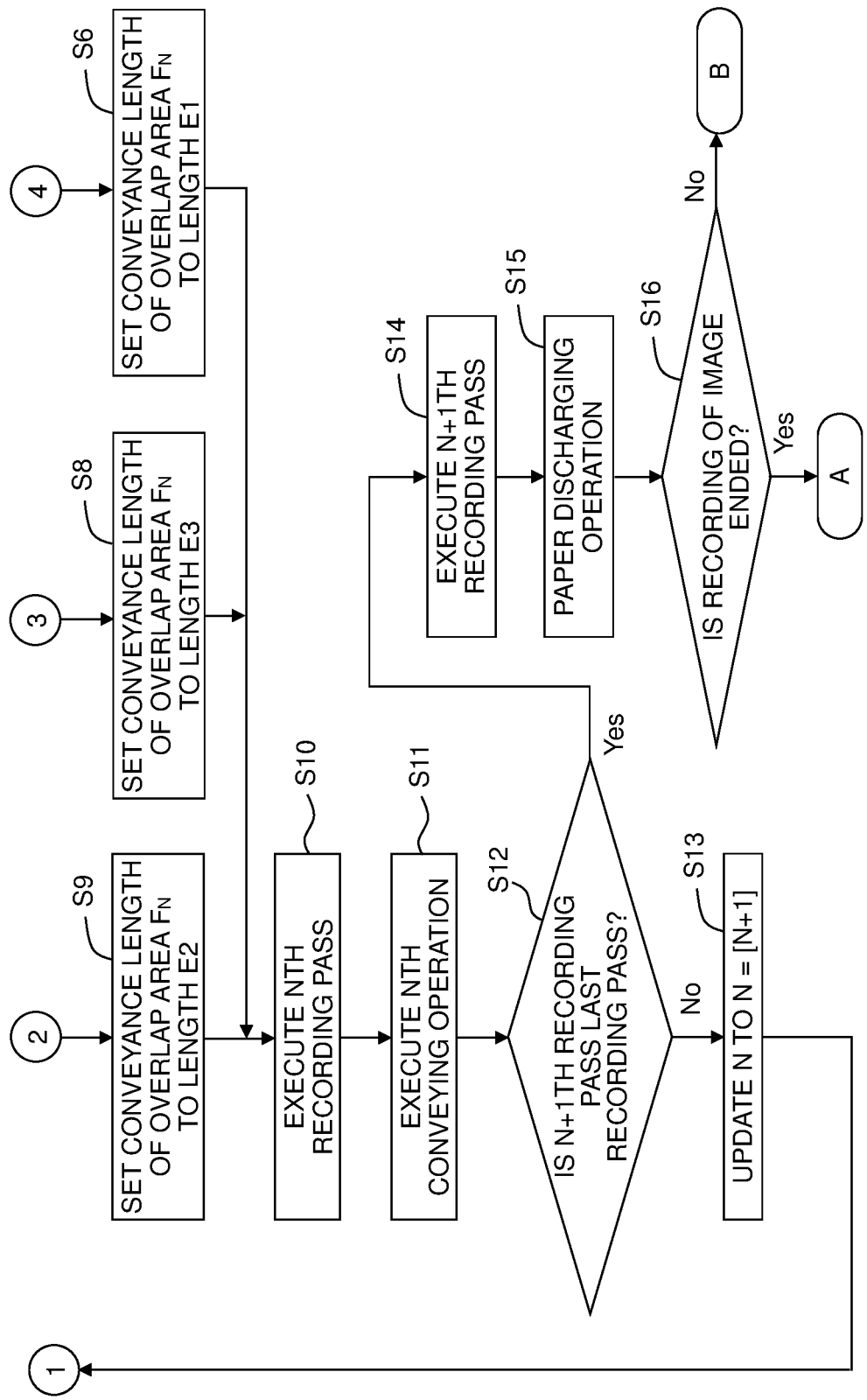

In the following, an example of an operation according to the recording processing of the ink-jet printer 1 will be explained, with reference to FIGS. 7A and 7B.

In a case that the controller 100 receives a recording command (recording instruction) from the external apparatus 200 (S1: YES), the controller 100 feeds a sheet P from the non-illustrated feeding section to a position at which the sheet P is capable of facing (of being opposite to) the head 50 (S2). Afterwards, the controller 100 sets a variable N to 1 (one) (S3). Next, the controller 100 executes a carriage velocity determining processing (S4) which will be explained later with reference to FIGS. 8A and 8B. In the carriage velocity determining processing, carriage velocities with respect to the Nth recording pass and the N+1th recording pass, respectively, are determined.

Next, the controller 100 determines or judges as to whether or not the carriage velocities determined with respect to the Nth recording pass and the N+1th recording pass, respectively, are both the normal velocity (S5). In a case that the controller determines that the carriage velocities determined with respect to the Nth recording pass and the N+1th recording pass, respectively, are both the normal velocity (S5: YES), the controller 100 sets the conveyance length E of the overlap area $F_N$ to the length E1 (S6).

On the other hand, in a case that that the controller 100 determines that either one of the carriage velocities determined with respect to the Nth recording pass and the N+1th recording pass, respectively, is not the normal velocity (S5: NO), then the controller 100 determines as to whether or not the carriage velocities determined with respect to the Nth recording pass and the N+1th recording pass, respectively, are both the low velocity (S7). In a case that the controller 100 determines that either one of the carriage velocities determined with respect to the Nth recording pass and the N+1th recording pass, respectively, is not the low velocity (S7: NO), the controller 100 sets the conveyance length E of the overlap area $F_N$ to the length E3 (S8).

On the other hand, in a case that that the controller determines that the carriage velocities determined with respect to the Nth recording pass and the N+1th recording pass, respectively, are both the low velocity (S7: YES), the controller 100 sets the conveyance length E of the overlap area $F_N$ to the length E2 (S9).

After the processing of step S6, S8, or S9, the controller 100 controls the carriage motor 16 and the head 50 to thereby execute the Nth recording pass (S10). By the Nth recording pass, the image is recorded on the recording area $K_N$. Note that in mask data used in a recording pass of which ordinal number is 2nd and a recording pass(es) thereafter (in which N is not less than 2), as a data part corresponding to an overlap area $F_{N-1}$ between the Nth recording pass and a N–1th recording pass, data corresponding to a conveyance length E set with respect to the overlap area $F_{N-1}$ is used therefor. Similarly, in mask data used in a recording pass which is different from the last recording pass, as a data part corresponding to an overlap area $F_N$ between the Nth recording pass and a N+1th recording pass, data corresponding to a conveyance length E set with respect to the overlap area $F_N$ is used therefor.

Afterwards, the controller 100 controls the conveying motor 20 so as to execute a Nth conveying operation of conveying the sheet P only by a predetermined conveyance amount with the pairs of conveying rollers 18 and 19 (S11). Here, the predetermined conveyance amount is an amount corresponding to a length [Ln–E] which is shorter, only by the conveyance length E set with respect to the overlap area $F_N$, than the length Ln in the conveyance direction of the nozzle array 52.

Next, the controller 100 determines as to whether or not the N+1th recording pass is the final or last recording pass in the case of recording an image on one piece of the sheet P (S12). In a case that the controller 100 determines that the N+1th recording pass is not the final recording pass (S12: NO), the controller 100 updates the variable N to [N+1], and returns to the processing of S4 in order to execute the next recording pass. On the other hand, in a case that the controller 100 determines that the N+1th recording pass is the final recording pass (S12: YES), the controller 100 executes the N+1th recording pass (S14). Then, the controller 100 controls the conveying motor 20 so as to execute a discharging processing of discharging the sheet P having the image recorded thereon to a non-illustrate paper discharge tray (S15). Afterwards, the controller 100 determines as to whether or not the recording of the image according to the recording instruction has been ended (S16). In a case that the controller 100 determines that the recording of the image has been ended (S16: YES), the controller 100 returns to the processing of S1. On the other hand, in a case that the controller 100 determines that the recording of the image has not been ended (S16: NO), the controller 100 returns to the processing of S2 in order to execute recording of an image to a next sheet of the sheet P.

Figure 8A:
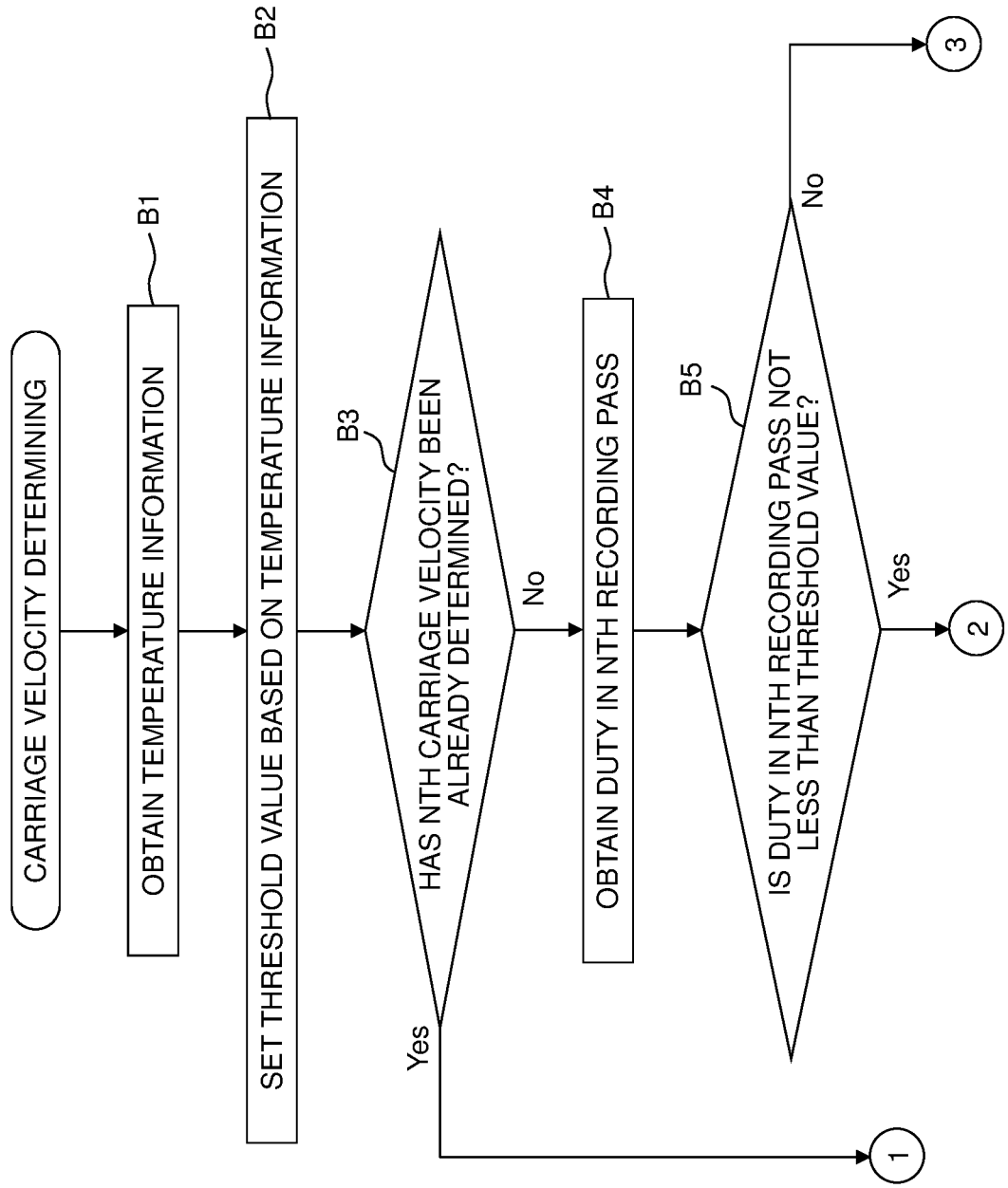

Next, an explanation will be given about the carriage velocity determining processing, with reference to FIGS. 8A and 8B.

At first, the controller 100 obtains the temperature information from the temperature measuring device 9 (B1), and sets the threshold value based on a temperature indicated by the obtained temperature information, and based on the threshold value setting table 104a (B2). Afterwards, the controller 100 determines as to whether or not the carriage velocity has been already determined with respect to the Nth recording pass (B3). Note that in the carriage velocity determining processing, the carriage velocity for the two continuous recording passes is determined. Accordingly, in a case of recording an image on one piece of the sheet P, in the carriage velocity determining processing executed for the second time and thereafter, the carriage velocity with respect to the Nth recording pass (preceding recording pass) has been already determined in the carriage velocity determining processing executed last time (previously). Accordingly, in the case of performing recording on one piece of the sheet P, the processing of each of steps B4 to B7 which are to be described below is a processing which can be executed only in the carriage velocity determining processing which is executed first.

In a case that the controller 100 determines that the carriage velocity has been already determined with respect to the Nth recording pass (B3: YES), the controller 100 proceeds to the processing of step B8. On the other hand, in a case that the controller 100 determines that the carriage velocity has not been already determined with respect to the Nth recording pass (B3: NO), the controller 100 calculates and obtains the duty in a case of executing the Nth recording pass (in a case that the Nth recording pass is to be executed), based on the image data IM (B4), Next, the controller 100 determines as to whether or not the duty obtained with respect to the Nth recording pass in the processing of B4 is not less than the threshold value set in the processing of B2 (B5). In a case that the controller 100 determines that the duty determined with respect to the Nth recording pass in the processing of B4 is not less than the threshold value set in the processing of B2 (B5: YES), the controller 100 sets the carriage velocity with respect to the Nth recording pass to the low velocity (B6), and proceeds to the processing of B8. On the other hand, in a case that the controller 100 determines that the duty obtained with respect to the Nth recording pass in the processing of B4 is less than the threshold value set in the processing of B2 (B5: NO), the controller 100 sets the carriage velocity with respect to the Nth recording pass to the normal velocity (B7), and proceeds to the processing of B8.

In the processing of B8, the controller 100 calculates and obtains the duty in a case of executing the N+1th recording pass, based on the image data IM (B8). Next, the controller 100 determines as to whether or not the duty in the N+1th recording pass, obtained in the processing of B8, is not less than the threshold value set in the processing of B2 (B9). In a case that the controller 100 determines that the duty in the N+1th recording pass is not less than the threshold value (B9: YES), the controller 100 sets the carriage velocity in the N+1th recording pass to be the low velocity (B10), and ends the present processing. On the other hand, in a case that the controller 100 determines that the duty in the N+1th recording pass is less than the threshold value (B9: NO), the controller 100 sets the carriage velocity in the N+1th recording pass to be the normal velocity (B11), and ends the present processing.

According to the present embodiment as described above, since the end parts, in which the landing amount of the liquid is small, in the recording areas K of the two continuous recording passes, respectively, are overlapped with each other, it is possible to reduce a part on the sheet P in which the landing amount of the liquid is small. Further, the spread in the conveyance direction of the recording area K in the recording pass is changed depending on the carriage velocity; in the present embodiment, however, the conveyance length E of the overlap area F in which the recording areas K of the two continuous recording passes, respectively, overlap with each other is adjusted depending on the carriage velocities determined with respect to the two continuous recording passes, respectively. With this, it is possible to overlap parts, in which the landing amounts of the liquid are small, in the recording areas K of the respective recording passes with each other. As a result, it is possible to suppress any occurrence of the streak-like unevenness in density along the scanning direction, and thus to suppress any degradation in the quality of the image recorded on the sheet P.

Further, in a case of recording a line image corresponding to one line in the scanning direction in the overlap area F, the controller 100 uses different nozzles 51 in the two continuous recording passes, respectively, so as to record thinned-out images in which different parts of the line image are thinned out in the two continuous recording passes, respectively. With this, it is possible to suppress any occurrence of the unevenness in density which would be otherwise caused due to any shift or deviation in the landing positions of the ink discharged from the nozzles 51 formed on the both end parts in the conveyance direction of the head 50.

In the foregoing, the embodiment of the present disclosure has been explained. The present disclosure, however, is not limited to or restricted by the above-described embodiment; a various kinds of change can be made to the present disclosure within the range described in the claims. For example, in a case that an image is to be recorded on one piece of the sheet P in the present embodiment, the duty is obtained, before starting the two continuous recording passes, with respect to each of the two continuous recording passes; it is allowable, however, to obtain the duties for all the recording passes, respectively, before starting the first recording pass.

Further, in a case that a line image corresponding to one line in the scanning direction in the overlap area F is to be recorded in the above-described embodiment, the controller 100 uses different nozzles 51 in the two continuous recording passes, respectively, so as to record thinned-out images in which different parts of the line image are thinned out in the two continuous recording passes, respectively. The present disclosure, however, is not limited to this. Namely, it is allowable to record the line image in the overlap area F with either one of the two continuous recording passes. In such a case, for example, the controller 100 may control the head 50 such that a line image to be recorded by the preceding recording pass and a line image to be recorded by the succeeding recording pass are arranged side by side in the conveyance direction.

Furthermore, in the above-described embodiment, although the "information regarding a supply state of the liquid from the liquid tank to the head" is exemplified by the information including two pieces of the information which are the duty and the temperature information outputted from the temperature measuring device 9, the present disclosure is not particularly limited to this. It is allowable, for example, that the "information regarding a supply state of the liquid from the liquid tank to the head" may be information including only either one of the duty and the temperature information outputted from the temperature measuring device 9. Moreover, in a case that the integrated amount of the ink passing through the filter FT which is disposed at the connection location at which the internal channel of the head 50 and each of the buffer tanks 60 are connected to each other is increased, the amount of any foreign matter trapped or caught by the filter FT is increased, which in turn leads to such a possibility that the filter FT might be clogged. In a case that the filter FT is clogged, the channel resistance is increased at a part provided with the filter FT, and thus any short supply of the ink to the head 50 might easily occur. Accordingly, information regarding the total supply amount of the ink supplied from the ink cartridge C to the head 50 may be obtained as the "information regarding a supply state of the liquid from the liquid tank to the head". In such a case, it is allowable, for example, to set the threshold value which is to be compared with the duty to be smaller, as the total supply amount of the ink supplied to the head 50 is greater. The information regarding the total supply amount of the ink supplied from the ink cartridge C to the head 50 may be an actual total supply amount of the ink supplied from the ink cartridge C to the head 50, or the number of times of exchange of the ink cartridge C.

Further, in the above-described embodiment, although the reference mask data U is stored and a part of the reference mask data U is used, depending on the actual length of the overlap area F, so as to determine a mask data part of the overlap area F, the present disclosure is not limited to this. It is allowable, for example, that a plurality of piece of mask data (mask data as depicted in each of FIGS. 6A to 6C) corresponding to the lengths in the conveyance direction of the overlap area F, respectively, are individually stored.

Furthermore, in the above-described embodiment, although the carriage velocity is constructed to be adjustable in the two stages which are the normal velocity and the low velocity, it is allowable that the carriage velocity is constructed to be adjustable finely in three or more stages. Moreover, in the above-described embodiment, although the conveyance length of the overlap area N is constructed to be adjustable in the three stages, the present disclosure is not particularly limited to this; it is allowable that the conveyance length of the overlap area N is constructed to be adjustable in two or more stages. It is allowable, for example, that only the two kinds of the lengths which are the length E1 and the length E2 are provided to be settable as the conveyance length E of the overlap area N; in a case that the carriage velocities determined with respect to the Nth and N+1th recording passes are both the normal velocity, it is allowable that the conveyance length E of the overlap area $F_N$ is set to be the length E1, whereas in a case that the carriage velocity determined with respect to at least one of the Nth and N+1th recording passes is the low velocity, it is allowable that the conveyance length E of the overlap area $F_N$ is set to be the length E2.

Further, in the above-described embodiment, although the conveyance length E of the overlap area $F_N$ is set based only on the carriage velocities determined with respect to the Nth and N+1th recording passes, respectively, it is allowable, for example, that the conveyance length E of the overlap area $F_N$ is set based also on the image data IM according to the image to be recorded on the sheet P, in addition to the carriage velocities. For example, in a case that the amount of the ink to be discharged with respect to a joint part between the recording areas K of the two continuous recording passes is less than a predetermined threshold value, any unevenness in density therein is less likely to be conspicuous even if an amount of the ink landed per unit area becomes to be small at the joint part. In view of this situation, also in such a case that the carriage velocities determined for the Nth and N+1 th recording passes, respectively, are both the normal velocity, and that the controller 100 determines that the amount of the ink to be discharged onto the joint part between the recording areas $K_N$ and the recording area $K_{N+1}$ of these recording passes is less than the predetermined threshold value, the controller may set the conveyance length E of the overlap area $F_N$ to be the length E2 or the length E3, rather than the length E1.

In the above-described embodiment, the ink cartridges are arranged in the inside of the casing of the printer. The present disclosure, however, is not limited to or restricted by such an aspect. It is allowable that the liquid tank(s) such as the ink cartridge(s) are provided as separate body (bodies) from the printer. Further, although the foregoing explanation has been made regarding the example wherein the present disclosure is applied to a printer which discharges ink(s) from the nozzles onto the paper sheet to thereby record an image on the paper sheet, the present disclosure is not limited to this. It is allowable to apply the present disclosure to an image recording apparatus configured to discharge a liquid onto a recording medium, which is different from the sheet P, to thereby record an image on the recording medium. For example, the present disclosure is applicable also to a printer in which a stage having a recording medium placed thereon is movable in the conveyance direction, and which is configured to perform recording on a recording medium by alternately repeating an operation of discharging the ink from the nozzles while moving a head together with a carriage in the scanning direction (recording pass) and an operation of moving the stage, as described for example in Japanese Patent Application Laid-open No. 2017-144726. The recording medium usable in such a printer includes, for example, a T-shirt, a sheet for outdoor advertisement, etc. Further, the present disclosure is applicable also to an image recording apparatus which discharges or jets a liquid different from the ink, for example, a material for wiring pattern, etc., onto a wiring substrate. Furthermore, the present disclosure is applicable also to an image recording apparatus which discharges an ink onto a case for a mobile terminal (portable terminal) such as smartphone, etc., a corrugated cardboard box, a resin, etc.

What is claimed is:
1. An image recording apparatus comprising:
a conveyer configured to convey a recording medium in a conveyance direction;
a carriage configured to reciprocate in a scanning direction crossing the conveyance direction;
a head mounted on the carriage and configured to discharge liquid supplied thereto from a liquid tank via a supply path, the head including a plurality of nozzles aligned in the conveyance direction; and
a controller configured to control the conveyer, the carriage and the head to execute:
recording an image on one piece of the recording medium by alternately executing a plurality of recording passes each causing the liquid to be discharged from the plurality of nozzles while moving the carriage and a plurality of conveying operations each causing the conveyer to convey the recording medium; and
in a case that recording the image on one piece of the recording medium is executed,
in each of the plurality of conveying operations, causing the conveyer, to convey the recording medium in the conveyance direction such that recording areas, on the recording medium, on which the image is recorded by two continuous recording passes of the plurality of recording passes, are partially overlapped with each other in the conveyance direction,
obtaining, with respect to each of the plurality of recording passes, information regarding a supply state of the liquid from the liquid tank to the head in a case of executing each of the plurality of recording passes, determining a moving velocity of the carriage with respect to each of the plurality of recording passes, based on the information regarding the supply state, and increasing or decreasing a length in the conveyance direction of an overlap area in which the recording areas by the two continuous recording passes overlap with each other in the conveyance direction, by adjusting a conveyance amount, by which the recording medium is conveyed in each of the plurality of conveying operations, depending on moving velocities of the carriage determined with respect to the two continuous recording passes, respectively.

2. The image recording apparatus according to claim 1, wherein in a case that the controller controls the conveyer, the carriage and the head to record a line image corresponding to one line in the scanning direction in the overlap area of the two continuous recording passes, the controller is configured to control the head to use mutually different nozzles, among the plurality of nozzles, in the two continuous recording passes, respectively, to record thinned-out images in which different parts of the line image are thinned out in the two continuous recording passes, respectively.

3. The image recording apparatus according to claim 1, wherein the information regarding the supply state includes information regarding a liquid discharge amount of the liquid from the head in the case of executing each of the plurality of recording passes.

4. The image recording apparatus according to claim 3, wherein the information regarding the liquid discharge amount includes a duty which is a ratio of a discharge amount of the liquid from the plurality of nozzles to a maximum discharge amount of the liquid from the plurality of nozzles, the maximum discharge amount being an amount of the liquid discharged from all the plurality of nozzles in a certain recording pass included in the plurality of recording passes.

5. The image recording apparatus according to claim 1, further comprising a temperature sensor,
wherein the information regarding the supply state includes temperature information regarding a temperature measured by the temperature sensor.

6. The image recording apparatus according to claim 1, further comprising a filter provided on the supply path,
wherein the information regarding the supply state includes a total supply amount of the liquid supplied from the liquid tank to the head while passing through the filter.

7. The image recording apparatus according to claim 1, further comprising:
a filter provided on the supply path; and
a tank installing part configured to detachably install the liquid tank,
wherein the information regarding the supply state includes a number of times of exchange of the liquid tank.

8. The image recording apparatus according to claim 1, wherein the controller is configured to execute:
obtaining the information regarding the supply state in each of the two continuous recording passes;
determining the moving velocities of the carriage in the two continuous recording passes, respectively, based on the obtained information regarding the supply state; and
determining the length in the conveyance direction of the overlap area of the two continuous recording passes, based on the moving velocities of the carriage determined with respect to the two continuous recording passes, respectively.

9. The image recording apparatus according to claim 8, wherein in a case that the controller controls the conveyer, the carriage and the head to start the two continuous recording passes, the controller is configured to execute:
obtaining the information regarding the supply state in each of the two continuous recording passes;
determining the moving velocities of the carriage in the two continuous recording passes, respectively, based on the obtained information regarding the supply state; and
determining the length in the conveyance direction of the overlap area of the two continuous recording passes, based on the moving velocities of the carriage determined with respect to the two continuous recording passes, respectively.

10. The image recording apparatus according to claim 1, wherein the moving velocities of the carriage determined with respect to the two continuous recording passes include one moving velocity of the carriage determined with respect to one continuous recording pass of the two continuous recording passes and the other moving velocity of the carriage determined with respect to the other continuous recording pass of the two continuous recording passes,
in a case that both the one moving velocity and the other moving velocity are a first moving velocity, the controller is configured to adjust the length in the conveyance direction of the overlap area of the two continuous recording passes to be a first length;
in a case that both the one moving velocity and the other moving velocity are a second moving velocity which is slower than the first moving velocity, the controller is configured to adjust the length in the conveyance direction of the overlap area of the two continuous recording passes to be a second length shorter than the first length; and
in a case that the one moving velocity is the first moving velocity and that the other moving velocity is the second velocity, the controller is configured to adjust the length in the conveyance direction of the overlap area of the two continuous recording passes to be a third length which is shorter than the first length and longer than the second length.

11. The image recording apparatus according to claim 1, wherein the head includes a nozzle array extending in the conveyance direction, the nozzle array including the plurality of nozzles aligned in the conveyance direction;
the image recording apparatus further comprises a memory configured to store reference mask data which is mask data for each of the recording areas in a case that the length in the conveyance direction of the overlap area is half length in the conveyance direction of the nozzle array; and
the controller is configured to determine mask data for the overlap area by using a part of the reference mask data, depending on the length in the conveyance direction of the overlap area.

12. The image recording apparatus according to claim 1, wherein the head includes a nozzle array extending in the conveyance direction, the nozzle array including the plurality of nozzles aligned in the conveyance direction; and
the image recording apparatus further comprises a memory configured to store a plurality of kinds of mask data according to the length in the conveyance direction of the overlap area.

* * * * *